United States Patent [19]

Wende et al.

[11] 4,367,196
[45] Jan. 4, 1983

[54] NEUTRONIC REACTOR

[75] Inventors: Charles W. J. Wende, Augusta, Ga.; Dale F. Babcock; Robert L. Menegus, both of Wilmington, Del.

[73] Assignee: U.S. Energy Research & Development Administration, Washington, D.C.

[21] Appl. No.: 656,468

[22] Filed: May 1, 1957

[51] Int. Cl.³ .............................................. G21C 7/10
[52] U.S. Cl. .................................. 376/333; 376/327; 376/237; 376/239; 376/339
[58] Field of Search ................ 204/154.2 R, 193.2 R, 204/154.3, 193.3; 176/86 R, 36 R

[56] References Cited

U.S. PATENT DOCUMENTS

| 2,774,730 | 12/1956 | Young | 204 193.2/ |
| 2,848,404 | 8/1958 | Treshow | 204/193.2 |
| 2,852,458 | 9/1958 | Dietrich et al. | 204/193.2 |
| 2,861,035 | 11/1958 | Zinn et al. | 204/193.2 |
| 2,898,281 | 8/1959 | Untermyer et al. | 204/193.2 |

OTHER PUBLICATIONS

Proc. of the Int. Conf. on the Peaceful Uses of Atomic Energy, Aug. 8-20, 1955, vol. 3, pp. 105, 160, 164, 299, 303, 333, 338, 335.
Engineer (London), vol. 203, (2/8/57), pp. 216-219.

*Primary Examiner*—Harvey E. Behrend

[57] ABSTRACT

A nuclear reactor includes an active portion with fissionable fuel and neutron moderating material surrounded by neutron reflecting material. A control element in the active portion includes a group of movable rods constructed of neutron-absorbing material. Each rod is movable with respect to the other rods to vary the absorption of neutrons and effect control over neutron flux.

7 Claims, 29 Drawing Figures

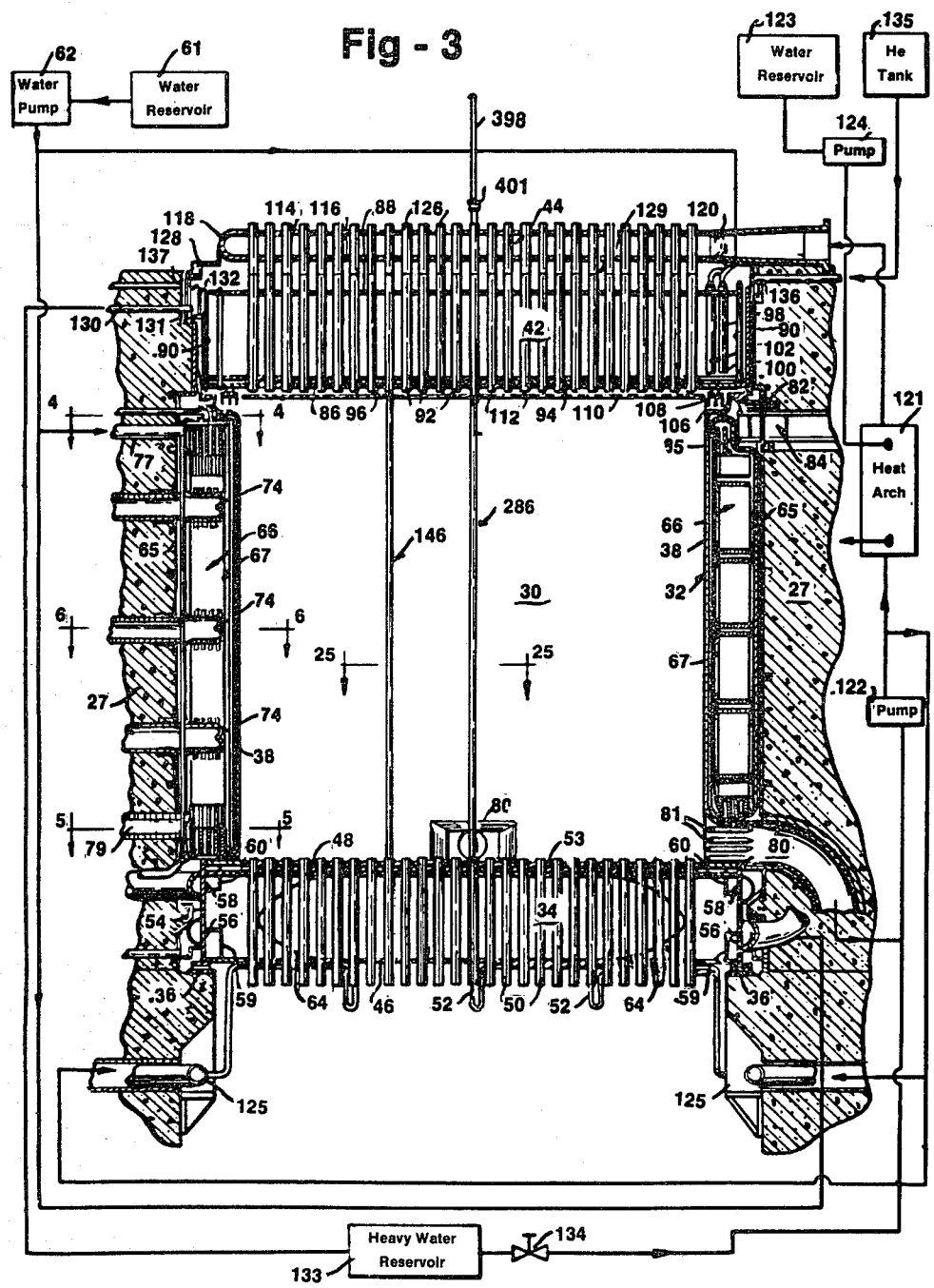

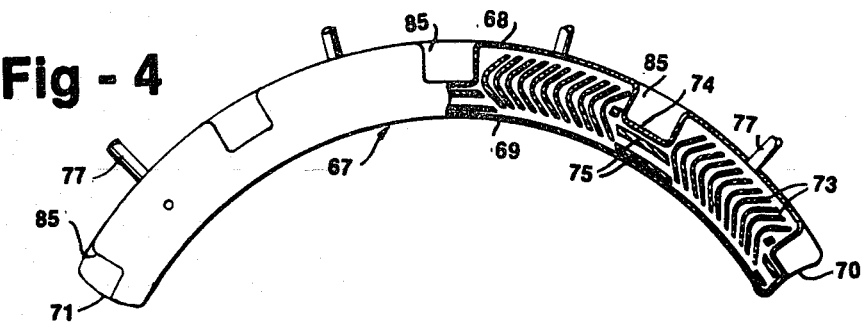
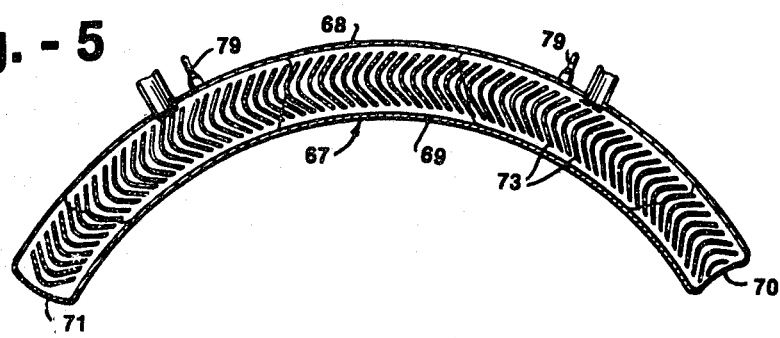
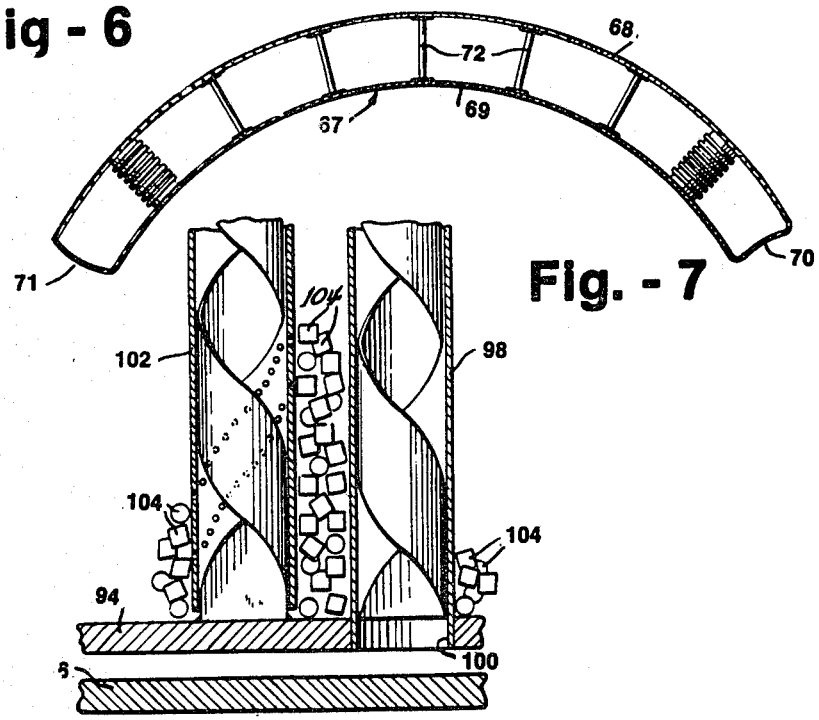

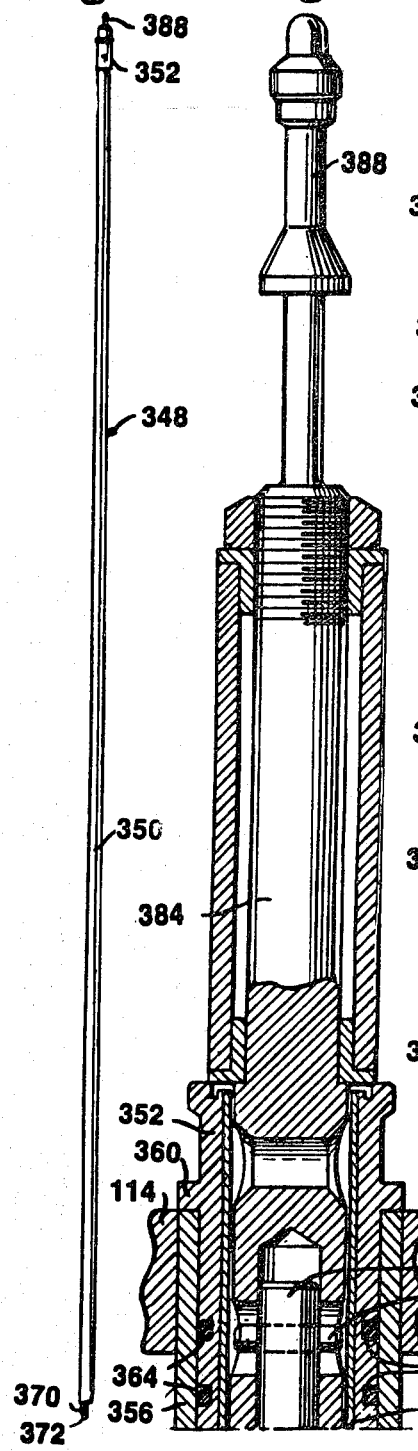
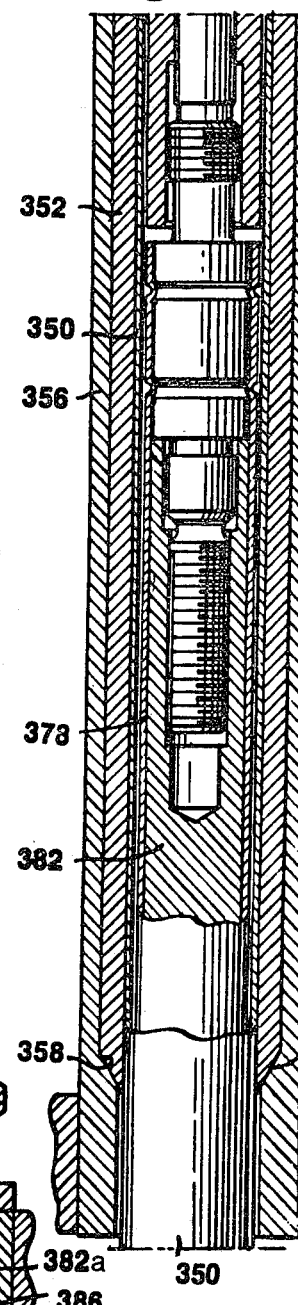
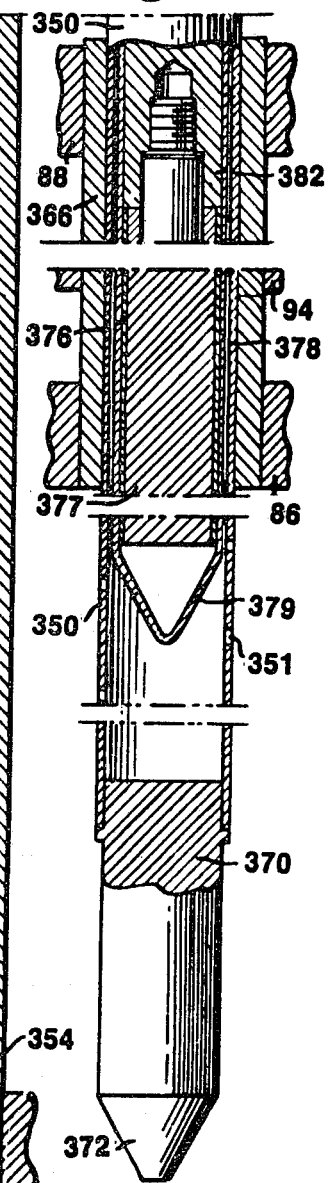

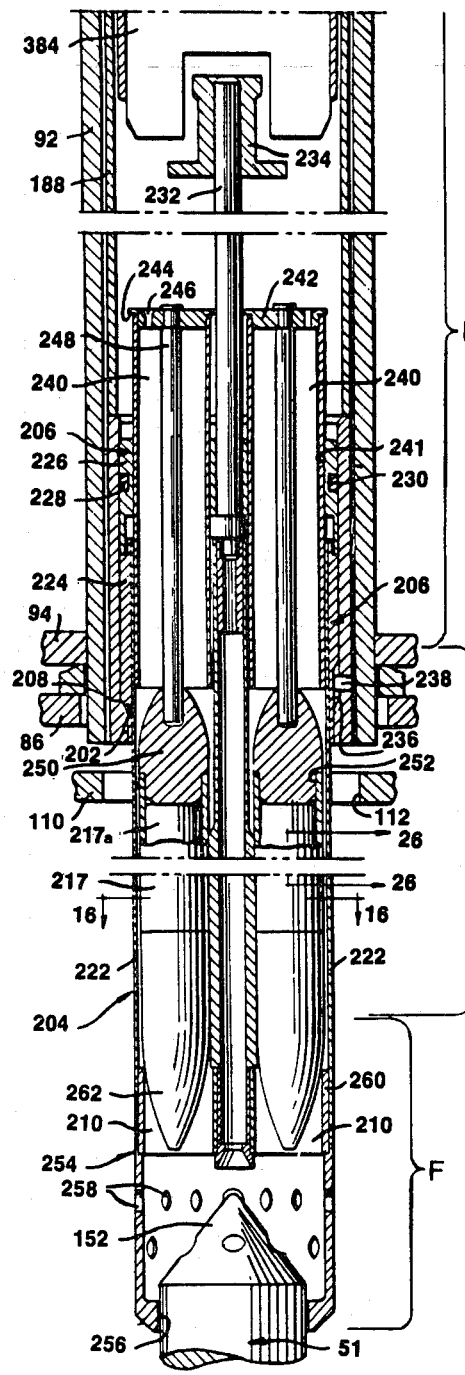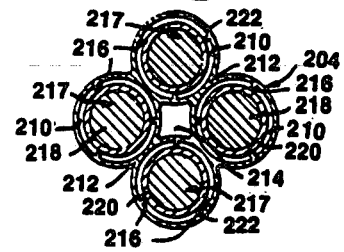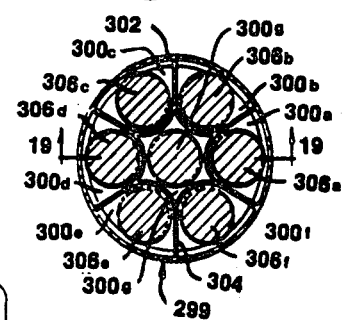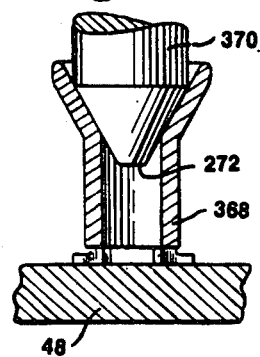

Fig. - 17  Fig. - 18  Fig. - 19
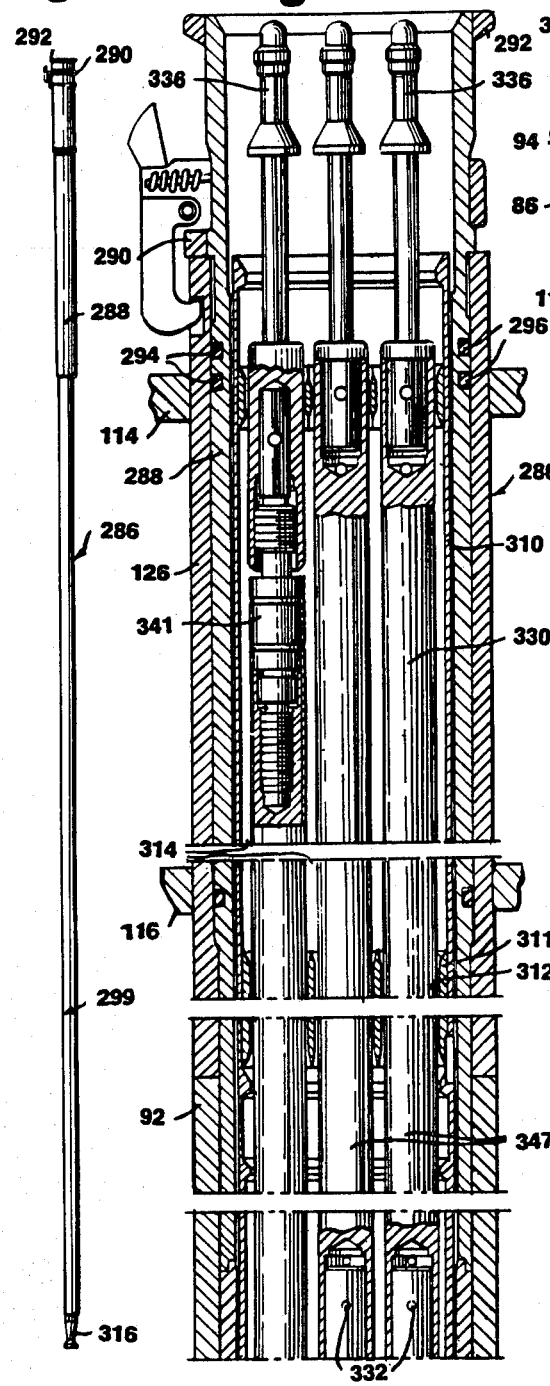
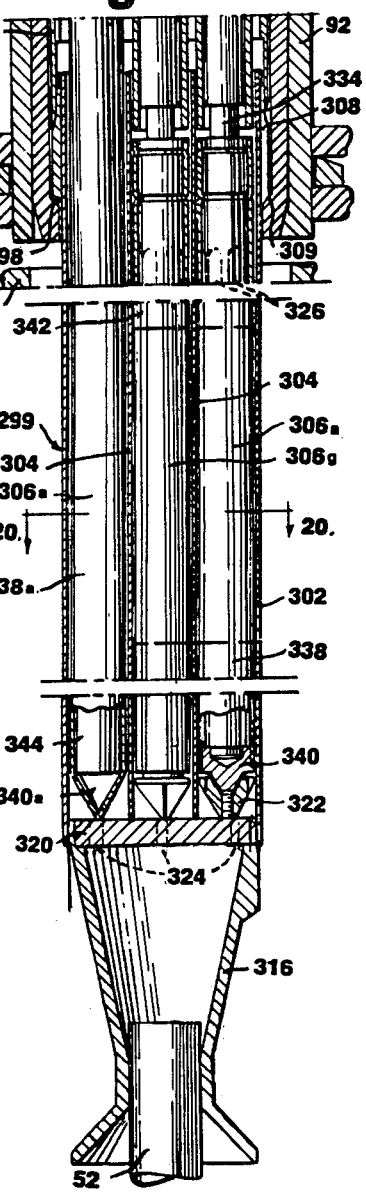

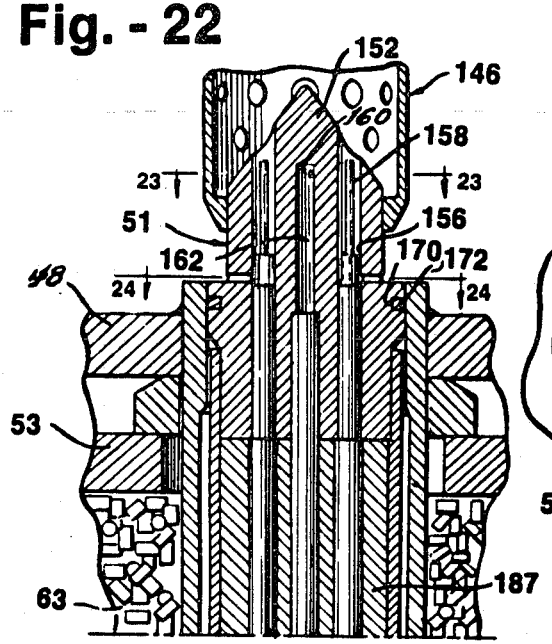
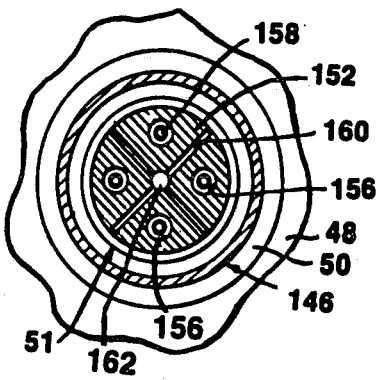
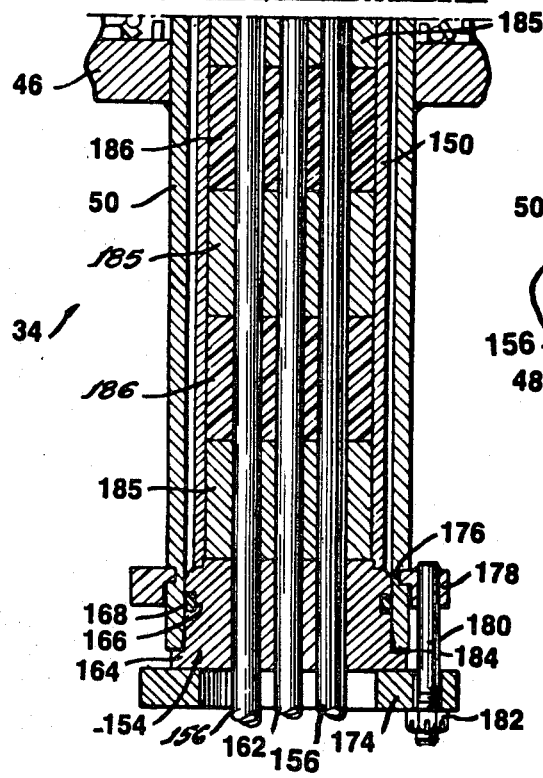
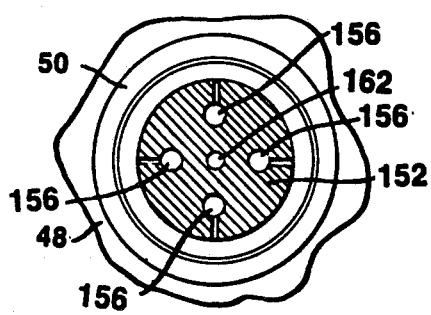
Fig. - 22
Fig. - 23
Fig. - 24

NEUTRONIC REACTOR

The present invention relates generally to neutronic reactors and in particular to heterogeneous neutronic reactors provided with neutron capturing control means.

Heterogeneous reactors are those which employ neutron fissionable materials in the form of bodies, usually disposed within a moderator material, rather than homogeneously distributing the thermal neutron fissionable material throughout the moderator material. The first neutronic reactor to be successfully operated was a heterogeneous reactor.

Most heterogeneous reactors employ uranium fuel with a $U^{238}$ content, and such reactors are constructed with "lumped geometry", i.e., the active portion of the reactor contains a body of moderator material and thermal neutron fissionable material wherein the fissionable material is arranged in lumps spatially disposed in a lattice arrangement in the moderator material. Such construction of the active portion of the reactor leads to a higher resonance escape probability, and hence a higher neutron multiplication factor ($K_\infty$) than is possible in homogeneous reactors with the same amounts of fuel and moderator. These and other advantages of heterogeneous reactors are discussed in "The Elements of Nuclear Reactor Theory", by Glasstone and Edlund, published by D. Van Nostrand Co., Inc., 1952, starting at Section 9.24 and extending through Section 9.46.

Heretofore, it has been the practice to control nuclear reactors with a relatively small number of individual control elements inserted at different points into the reactor. The rate of a neutronic reaction is controlled by varying the extent of insertion of such control elements made of materials having very high neutron-absorbing characteristics, commonly referred to as "neutron capture cross sections", in the active portion of the reactor. These elements, using solid absorber materials such as boron or cadmium, are also known as control rods.

The above described control elements, which are used generally at the present time, are usually adapted to occupy individual positions within the core of a reactor. The use of aforementioned control elements to achieve reactivity control has a disadvantage in that the resultant axial and radial neutron flux distributions deviates from the distribution that permit the maximum amount of heat to be removed from the reactor in the core of the reactor. The insertion of a control element into the core results in a local flux depression, as is shown in FIG. 11.10, Glasstone and Edlund, in "The Elements of Nuclear Reactor Theory", D. Van Nostrand Co., Inc., 1952, page 317. This uneven flux distribution may be the cause of abnormal local temperature rises commonly known as "hot spots" which cause thermal stresses in fuel elements and other reactor structures. As a result of the limitations imposed by these local disturbances of the neutron flux, maximum power output of the reactor may not be achieved.

An improvement over the aforementioned individually spaced control elements is described in the copending patent application of Untermyer and Hutter, Ser. No. 459,219, filed Sept. 29, 1954, now U.S. Pat. No. 2,898,281, wherein a plurality of rods, each rod having alternate neutron-absorbing and non-absorbing portions distributed along its length, are grouped together in a common housing and are maintained completely within the reactor during all phases of operation. But the reactor using this type of control element has to have a substantial amount of excess reactivity built thereinto because the rods comprising the control element remain at all times within the reactor proper. Furthermore, the range of this type of control is substantially limited.

The control elements, as described above, generally utilize material such as boron or cadmium for absorbing a certain portion of the neutrons released in the active portion of a reactor. This type of control is uneconomical inasmuch as the absorbed neutrons are not utilized in any manner.

Even though the abnormalities introduced by the use of the individual control rods are eliminated, the power output of the reactor is still limited by the maximum permissible temperature of the fuel elements. In some cases it is possible to increase a power output by decreasing the ratio $P_{max}/P_{av}$, that is the average power output of the reactor can be increased by a more uniform distribution of power density. The method of achieving this uniform distribution of power density through the reactor structure is commonly referred to as "flattening" of the power distribution, or neutron flux, inasmuch as the flux is directly proportional to the power. An operating reactor will generally have a horizontal flux distribution resembling a portion of a cosine curve, i.e., the flux is a maximum in the centrum of the active portion of the reactor and decreases toward the sides of said active portion. A flux distribution in a horizontal direction in an upright cylinder type reactor is called radial flux distribution and in the vertical direction is called axial distribution. The power output of a reactor having a cosine flux distribution can be increased by arranging fuel and moderator in the reactor in a particular manner to increase the flux near the sides of the active portion of the reactor to achieve a flattened effect on flux distribution.

Although the power output of a reactor can be increased or improved by flattening the power distribution or the flux in the reactor in the horizontal direction, the inventors have found that additional improvement in extraction of power from the reactor can be achieved by modifying the flux distribution in the vertical (axial) disposition of the reactor. Since a coolant is introduced into a reactor usually from a single direction, the inventors have found that, by increasing the flux (power) in the region adjacent to the entry of the coolant into the reactor, more heat (power) can be removed by the cold coolant as it enters the reactor. The magnitude of the flux density is maximum near the point of entry of the coolant into the reactor, said magnitude decreasing along the path of flow in the reactor towards the exit of said coolant from the reactor. This method of increasing power output of a reactor is termed "rooftopping".

The principal object of the invention is to provide an arrangement of reactivity control means to achieve optimum flux distribution and maximum power output in a reactor.

Another object of the invention is to provide means comprising various neutron-absorbing materials for controlling reactivity wherein the absorbed neutrons are utilized gainfully.

Another object of the invention is to provide means for controlling neutronic reactivity in a reactor over a wide range in small steps.

A further object of the invention is to provide an arrangement of control elements for controlling reactivity in a nuclear reactor wherein the control elements are arranged in a particular pattern and each element has groups of control rods which are moved individually or in groups to provide flexibility in control.

Other objects and advantages of neutronic reactors constructed according to the teachings of the invention will become readily apparent from a study of the following description of the invention, together with the illustrative embodiment enclosed herein.

In accordance with the teachings of this invention, there is provided a neutronic reactor having a plurality of regions of control in which a plurality of control elements are disposed. Each control element contains a group of full-length and short-length control rods made of materials possessing different neutron-capture cross section characteristics. The control elements are arranged in concentric rings or gangs and occupy particular positions in a lattice arrangement of fuel elements in the core of the reactor. Some of the control rods may function only to absorb thermal neutrons per se while others absorb thermal neutrons to produce radioactive isotopes. The short-length control rods which are substantially shorter than the fuel rods, are adapted to be placed in a particular portion of the core to modify the overall flux distribution. An improvement in the power output of the reactor is obtained by improving the radial (horizontal) flux distribution of the reactor by using the control rods grouped in concentric rings to give a flattening of the radial neutron flux distribution and by rooftopping the flux distribution in the axial (vertical) direction of the reactor by introducing short-length control rods in the region of the core which is most remote from the entry of the coolant flowing therethrough. The positioning of the short-length control rods in a down flow relationship to the coolant has the effect of modifying the axial flux distribution in such a way as to present a maximum flux density available near the point of entry of the coolant, where the temperature differential between the coolant and the fuel elements is the greatest.

The present invention is illustrated in the following FIGS.:

FIG. 3 is a sectional view of the reactor taken along line 3—3 of FIG. 2 and a schematic diagram of the reactor coolant systems, and a gas system;

FIG. 4 is a view of a reactor tank taken along the line 4—4 of FIG. 3;

FIG. 5 is a sectional view of the reactor tank taken along line 5—5 of FIG. 3;

FIG. 6 is a sectional view of the reactor tank taken along line 6—6 of FIG. 3;

FIG. 7 is a fragmentary sectional view illustrating a portion of the upper shield enlarged from that of FIG. 3;

FIG. 8 is an elevational view of a safety rod for the reactor;

FIG. 9 is a vertical sectional view of the upper portion of the safety rod illustrated in FIG. 8;

FIG. 10 is a vertical sectional view of the central portion of the safety rod illustrated in FIG. 8;

FIG. 11 is a vertical sectional view of the lower end portion of the safety rod illustrated in FIG. 8;

FIG. 15 is a vertical sectional view of the lower portion of the fuel element illustrated in FIG. 12;

FIG. 16 is a transverse sectional view taken along the line 16—16 of FIG. 15;

FIG. 17 is an elevational view of one of the control elements illustrated in FIG. 3;

FIG. 18 is a vertical sectional view of the upper portion of the control element illustrated in FIG. 17;

FIG. 19 is a vertical sectional view of the lower portion of the control element illustrated in FIG. 17;

FIG. 20 is a sectional view taken along the line 20—20 of FIG. 19;

FIG. 21 is a fragmentary sectional view of the lower portion of the reactor tank illustrating the seat for one of the safety rods illustrated in FIG. 8;

FIG. 22 is a fragmentary enlarged vertical sectional view of a portion of the bottom shield of the reactor;

FIG. 23 is a sectional view taken along the line 23—23 of FIG. 22;

FIG. 24 is a sectional view taken along line 24—24 of FIG. 22;

Figure 1:
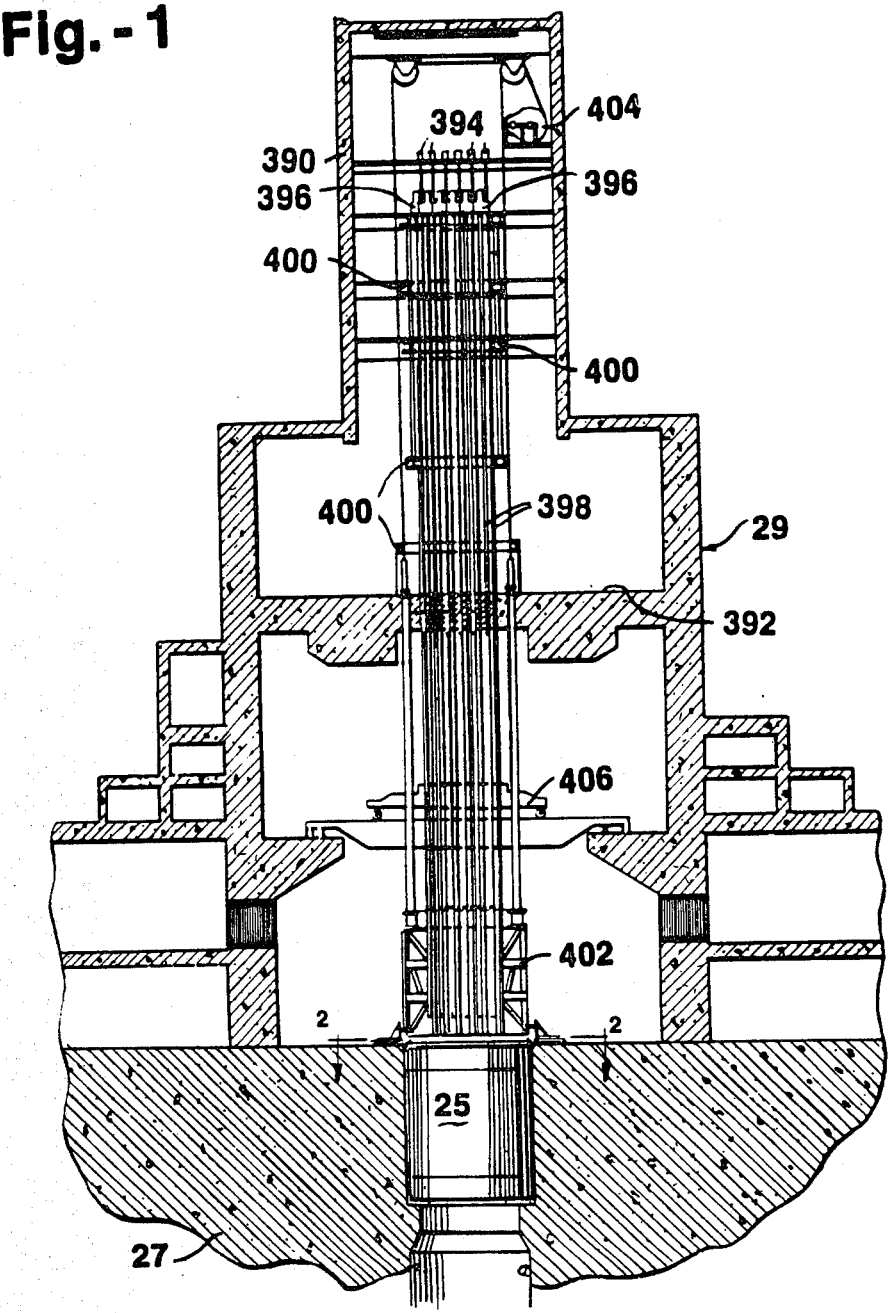
FIG. 1 is a sectional view illustrating a reactor constructed according to the teachings of the present invention.
Figure 2:
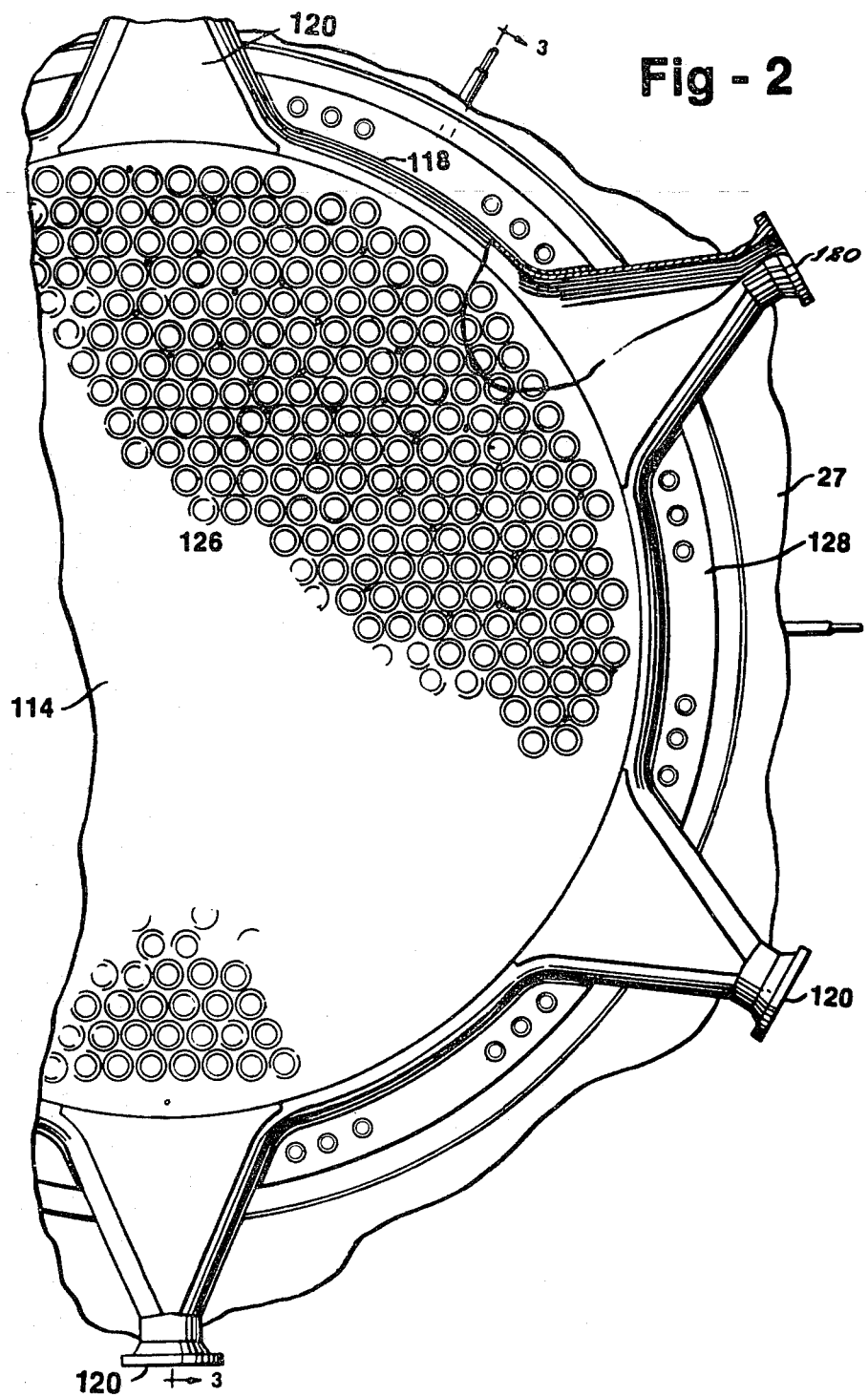
FIG. 2 is a sectional view of the reactor taken along line 2—2 of FIG. 1.

The reactor shown in the drawings illustrates one embodiment of a reactor constructed according to the teachings of the present invention, and the following disclosure will describe one construction of this embodiment in detail, setting forth the materials and dimensions used in this construction. It will, of course, be understood that other reactors may be constructed embodying the present invention with materials and dimensions different than those set forth, except as limited by the appended claims.

FIG. 1 illustrates the reactor 25 mounted within the concrete base 27 of the reactor supporting structure 29. The concrete base 27 serves both as a structural member and as a radiation and particle attenuating shield.

As illustrated in FIG. 3, the reactor active portion 30 is disposed within a cylindrical tank 32. As used in this application the "active portion" of the reactor is the region of the reactor that contains the thermal neutron fissionable material. The bottom of the tank 32 is a bottom shield 34 which is mounted upon a ridge 36 protruding from the concrete base 27. The walls of the tank are formed by a continuous hollow stainless steel cylinder 38 which rests upon and is sealed to the bottom shield 34 of the reactor 25. A top shield 42 is also supported by the concrete base 27 and is sealed to the cylinder 38 of the tank 32. A plenum chamber 44 for heavy water coolant is disposed above the top shield 42 and rests upon the top shield 42.

The bottom shield 34 is provided with a bottom plate 46 and a parallel top plate 48 spaced therefrom. Both the top plate 48 and the bottom plate 46 have an outer diameter of 18 feet 7¾ inches and are constructed of 1 inch thick stainless steel. A plurality of tubes 50 extend vertically through both the top plate 48 and the bottom plate 46 of the bottom shield 34 for the purpose of accommodating pins 51, illustrated in FIGS. 22 through 24, for centering the fuel elements of the reactor and coolant pipes 52 for the control elements of the reactor, as will be hereinafter described. The bottom shield 34 is provided with 673 tubes 50 which are constructed of stainless steel with an inner diameter of 3.32 inches, outer diameter of 3 15/16 inches, and a length of 49.4375 inches. The tubes 50 are disposed in a triangular array and spaced from each other 7 inches between centers. A baffle plate 53 constructed of stainless steel is disposed between the bottom and top plates 46 and 48 of the bottom shield 34 and spaced approximately 1 inch from the top plate 48. The baffle plate 53 is constructed of stainless steel and is approximately 1 inch thick. An annular member 54 surrounds the bottom shield 34 and is sealed to the peripheries of the bottom and top plates 46 and 48. The annular member 54 is provided with a plurality of spaced apertures 56 and 58. The apertures 56 are adjacent to the bottom plate 46 and the apertures 58 are adjacent to the baffle plate 53, and weirs 59 and 60 disposed adjacent to the apertures 56 and 58, respectively, assure circulation of water along the bottom plate 46, then upwardly to the outlet ports 58. A source 61 of water ($H_2O$) is connected to the inlet aperture 56 through a pump 62 to maintain the bottom shield 34 full of water and to circulate the water. In addition to the circulated water, the lower shield is filled with Raschig rings 63 of stainless steel tubing approximately ¼ inch in diameter and ¼ inch in length, as illustrated in FIG. 22. A plurality of webs 64 extend inwardly from the annular member 54 between the bottom plate 46 and the baffle plate 53 and aid in supporting the top plate 48 and in providing proper water circulation.

The hollow cylinder 38 which forms the walls of the reactor tank 32 is spaced from a coaxial hollow steel cylinder 65 with a larger diameter which abuts the concrete base 27. A thermal shield 66 includes the cylinders 38 and 65 and the region between the two cylinders 38 and 65. Three arcuate cooling tanks 67, each of which occupies a sector of 120°, are disposed in the region between the cylinders 38 and 65 and entirely surround the active portion 30 of the reactor 25. As clearly illustrated in FIGS. 4, 5 and 6, the tanks 67 are provided with coaxial arcuate walls 68 and 69 and ends 70 and 71 to form sealed units. One of the ends 70 of each annular tank 67 is curved inwardly while the other end 71 has a corresponding outward curve so that the three tanks fit together in abutting relationship without radiation permeable spaces which would impair the effectiveness of the thermal shield 66. The arcuate walls 68 and 69 are separated and supported by spacers 72 extending therebetween adjacent to the top and bottoms thereof, and the space between the walls 68 and 69 in the central regions is essentially filled with aligned chevron shaped Duriron members 73. The Duriron members 73 are disposed sufficiently close to each other to form a continuous radiation barrier. As illustrated in FIG. 3, the tanks 67 are provided with indentations 74 adjacent to the cylinder 65 in their central regions to accommodate radiation sensitive measuring devices for controlling the reactor. Duriron sheets 75 are disposed within the tanks 67 between the indentations 74 in the wall 68 of the tank and the wall 69 thereof to attenuate radiations emanating from the active portion 30 of the reactor. The coolant tanks 67 have water inlet ports 77 which are connected to the water source 61 and outlet ports 79 so that the tanks 67 contain water which is circulated therethrough.

The cylinder 38 is constructed of stainless steel approximately ½ inch thick and is continuous with a diameter of 16 ft. 2¾ inch. The distance between the top plate 48 of the bottom shield 34 and the top shield 42 is 15 feet 4 inches. The second steel cylinder 65 is spaced from the first cylinder 38 by a distance of approximately 22⅜ inches and has a thickness of approximately ¼ inch. The walls 68 and 69 of the coolant tanks 67 are spaced 20 inches apart by the spacers 72, the walls 69 of the tanks being spaced from the cylinder 38 by a distance of approximately 1½ inches and the walls 68 of the cooling tanks being spaced from the cylinder 65 by a distance of approximately ⅞ inch. Each of the cooling tanks 67 contains 75 Duriron members 73 spaced approximately 3.014 inches between centers. Further, each of the members 73 is aligned with adjacent members 73 and has an essentially right angled cross section, as illustrated in FIGS. 4 and 5. There are three rows of indentations 74 in the outer walls 68 of the cooling tanks 67 which extend around the tank 32 at 30° intervals, the rows being separated by a distance of 4 feet 1 inch with the lower row being a distance of 3 feet 6½ inches above the top plate 48 of the bottom shield 34. Each of the indentions 74 is annular in shape with a diameter of approximately 14 inches and extends inwardly from the outer walls 68 of the coolant tanks 67 a distance of approximately 13½ inches. The walls 68 and 69 and ends 70 and 71 of the tanks 67 are constructed of type 304 stainless steel and are ⅜ inch thick.

The three annular cooling tanks 67 are disposed in the annulus between the cylinder 38 and the cylinder 65. The cylinder 38 of the reactor tank 32 is provided with six coolant outlet ports 80 adjacent to the top plate 48 of the bottom shield 34, said ports being equally spaced around the periphery of said cylinder. Each of the coolant outlets 80 is cylindrically shaped with a diameter of approximately 15 inches. The coolant outlets 80 are provided with a plurality of deflecting plates 81 to provide radiation shielding and to provide an even flow of the heavy water coolant out of the reactor tank 32.

The top shield 42 of the reactor rests upon a support ring 82 which is anchored in the concrete base 27 by a reinforcing structure 84 embedded in the base 27. Recesses 85 in the cooling tanks 67 accommodate the reinforcing structure 84. The top shield 42 has a bottom plate 86 which abuts the supporting ring 82, and a parallel top plate 88 which is mounted to the bottom plate 86 by an annular member 90 extending about the peripheries of the bottom plate 86 and the top plate 88 and forming a water-tight seal therewith. A plurality of 673 parallel equally spaced tubes 92 extends through the bottom plate 86 and the top plate 88 and are sealed thereto. The tubes 92 in the top shield 42 are constructed of stainless steel, and have inside diameters of 4.385 inches, outside diameters of 5⅛ inches, and lengths of 3 feet 10⅜ inches. The tubes 92 are disposed in a triangular array spaced 7 inches between centers, and are in axial alignment with the tubes 50 of the bottom shield 34. A baffle plate 94 is disposed between the bottom plate 86 and the top plate 88 of the top shield 42 and rests upon collars 96 disposed between the baffle plate 94 and the bottom plate 86. The baffle plate 94 is spaced approximately 1 inch from the bottom plate 86 and is constructed of stainless steel 1 inch thick. The bottom plate 86 and the top plate 88 are also constructed of stainless steel approximately 1 inch thick.

The top shield 42 is cooled by a flow of water from the source 61 entering into the shield 42 through a series of spaced pipes 98 which extend through the top plate 88 to apertures 100 about the periphery of the baffle plate 94, as illustrated in FIGS. 3 and 7. A series of pipes 102 extend from the interior of the top shield 42 to the exterior thereof to conduct the water coolant out of the top shield 42. As in the case of the bottom shield 34, the region between the top plate 88 and the baffle plate 94 of the top shield 42 contains neutron-absorbing materials in the form of Raschig rings 104 constructed of stainless steel having a diameter of approximately $\frac{1}{4}$ inch and a length of approximately $\frac{1}{4}$ inch.

As the reactor temperature changes, the sizes of various portions of the reactor will alter, and hence a flexible expansion ring 106 is sealed to the cylinder 38 of the tank 32 and to the supporting ring 82. Since the bottom plate 86 of the top shield 42 is sealed to the supporting ring 82, no leakage occurs between the cylinder 38 of the tank 32 and the top shield 42. In order to inhibit the escape of radiation through the relatively transparent expansion ring 106, a plurality of parallel annular strips 108 are disposed vertically between the bottom plate 86 of the top shield 42 and the adjacent cylinder 38 of the tank 32. The strips 108 are constructed of stainless steel and are approximately 1 inch thick. A deflector plate 110 is disposed adjacent to the bottom plate 86 of the top shield 42 in the interior of the reactor tank 32 to increase the thermal shielding of the top portion of the reactor. It is constructed of stainless steel approximately 1 inch thick and spaced from the adjacent bottom plate 86 of the top shield 42 by 1 inch. The deflector plate 110 is provided with an aperture 112 adjacent to each of the tubes 92 of the top shield 42, each aperture having a diameter of $4\frac{3}{4}$ inches.

The reactor plenum chamber 44 is disposed adjacent to and above the top shield 42 of the reactor. It is provided with a top plate 114 and a parallel bottom plate 116. An annular water-tight housing 118 is sealed to the top plate 114 and to the bottom plate 116. A group of six equally spaced inlet ports 120 for admitting the heavy water coolant are disposed in the housing 118. Each of the inlet ports 120 is connected through a heat exchanger 121 and a pump 122 to one of the coolant outlets 80 in the tank 32 to provide a separate coolant circuit. A water reservoir 123 is connected to the heat exchanger 121 through a pump 124 and supplies the water ($H_2O$) to cool the heavy water ($D_2O$) in the heat exchanger 121. The pressure side of the pump 122 is also connected to an annular manifold 125 which distributes a portion of the heavy water to the coolant pipes 52, and thence to the control elements of the reactor, to be described hereinafter. Parallel tubes 126 extend through both the top plate 114 and the bottom plate 116 and are aligned with the tubes 92 in the top shield 42. Each of the tubes 126 is sealed to the top plate 114 and the bottom plate 116, and is provided with three equally spaced apertures 127 (FIG. 13) in the region between the top plate 114 and the bottom plate 116 for introducing the heavy water coolant into the reactor tubes 126. The tubes 126 have outside diameters of $5\frac{1}{4}$ inches, inside diameters of 4.375 inches and lengths of 19.125 inches. The top plate 114 and the bottom plate 116 are constructed of 1 inch thick stainless steel and are spaced $8\frac{3}{4}$ inches from each other. A water-tight housing 128 is sealed to the housing 118 and interconnects the top plate 114 and bottom plate 116 to the top plate 88 of the top shield 42, thereby preventing heavy water leakage from escaping from the reactor. The housing 128 forms a gas plenum chamber 129 between the bottom plate 116 of the plenum chamber 44 and the top plate 88 of the shield 42. A pipe 130 is connected to an orifice 131 in the housing 128 to carry away the heavy water leakage in the region between the bottom plate 116 of the plenum chamber 44 and the top plate 88 of the top shield 42. A weir 132 sealed about the periphery of the top plate 88 of the top shield 42 extends above the top plate 88 and determines the height of the heavy water coolant in the reactor. As a result of this construction, it is not necessary to eliminate all heavy water leakage between the tubes 92 and 126. The pipe 130 is connected to a heavy water reservoir 133 which collects and stores the overflow heavy water from the gas plenum chamber 129. A valve 134 separates the reservoir 133 from the heavy water circulation system, described hereinafter. Helium gas from a pressurized gas tank 135 is introduced into the gas plenum chamber 129 of the reactor through gas inlet ports, designated 136, disposed in the housing 128. Gas outlet ports 137, illustrated in FIG. 3, are disposed within the housing 128. Helium gas is circulated through the gas plenum chamber 129 to remove gases formed by the decomposition of heavy water.

The reactor is provided with fuel elements 146 which are vertically disposed within the reactor tank 32 and supported within the tubes 92 in the top shield 42 and tubes 126 in the plenum chamber 44. The fuel elements 146 rest upon the centering pins 51 which are disposed within the tubes 50 of the bottom shield 34, as best illustrated in FIG. 22. The pins 51 have a cylindrical sleeve 150 with a pointed head 152 at one end and a base 154 at the other end. The centering pins 51 perform three separate functions. They center the fuel elements 146 in the active portion 30 of the reactor, they measure the temperature of the coolant flowing through the fuel elements 146, and they measure the rate of flow of the coolant flowing through the fuel elements 146. In order to accomplish these functions, the head 152 of each pin 51 is provided with four equally spaced axial channels 156 for accommodating thermocouples 158, the channels 156 extending at right angles outward to the periphery of the head 152 in order to conduct a portion of the coolant flow past the thermocouples 158. The head 152 is also provided with a pair of radial transverse passages 160 which connect to an axial passage 162 for the purpose of transmitting a pressure signal to a means for monitoring the flow of the coolant.

The base 154 of the centering pins 51 is provided with a flange 164 which contacts the lower end of the tubes 50 of the bottom shield 34 to position the centering pins 51 therein. The base 154 is also provided with a groove 166 which accommodates a sealing ring 168. The head 152 of each centering pin 51 is also provided with a transverse groove 170 which accommodates a spacing ring 172. The ring 168 prevents leakage of coolant through the tubes 50 of the lower shield 34.

The centering pins 51 are secured in position within the tubes 50 of the bottom shield 34 by an annular flange 174 which abuts against the flange 164 on the base 154 of the centering pins 51. A transverse groove 176 extends about the periphery of the tube 50 adjacent to its lower end, and a split retaining ring 178 is secured therein. Threaded shafts 180 extend downwardly from the split retaining ring 178, and nuts 182 threaded upon the shafts 180 abut the flange 174 and maintain it in contact with the lower end of the tubes 50. A gasket 184 is disposed between the lower end of the tube 50 and the flange 164 on the pin 51.

The total length of the centering pins 51 is 4 feet 4 13/16 inches, the pins protruding 3 1/16 inches above the tubes 50 when disposed within the reactor. The sleeves 150 are constructed of type 304 stainless steel and have an outer diameter of 3 3/16 inches and an inner diameter of 2¾ inches and a length of 3 feet 11 5/32 inches. The head 152 is also constructed of type 304 stainless steel.

Since the centering pins 51 are to be disposed in the bottom shield 34 of the reactor, it is necessary that they contain neutron and radiation absorbing materials. To achieve this, a plurality of layers 185 are alternated with layers 186 within the sleeve 150, the layers 185 containing steel shot in the form of ⅛ inch diameter spheres and the layers 186 containing phenolic resin in the form of ⅛ inch particles. In addition, a layer 187 of lead is disposed within each sleeve 150 adjacent to the head 152 of the centering pin 51. The layer 187 is approximately 6 inches long, the adjacent layer 185 is approximately 4 inches long and consists of steel shot, and the other layers 185 and 186 which alternate within the tube 150 are each 2 inches long. The bottom plug 154 is also onstructed of type 304 stainless steel.

The fuel elements 146 for the reactor are illustrated in detail in FIGS. 12 through 16. The fuel elements 146 extend through the tubes 126 in the plenum chamber 44, the aligned tubes 92 in the top shield 42, and terminate directly over the centering pins 51 which protrude from the tubes 50 of the bottom shield 34. Each of the fuel elements 146 has a sleeve 188 which extends throught the plenum chamber 44, top shield 42 and into the tank 32 to approximately the region of the fissionable materials in the fuel elements 146. Even though the sleeve 188 has been illustrated as a part of the fuel element 146, it is to be understood that the sleeve 188 remains in the reactor 25 even when the fissionable materials have been removed therefrom. However, the sleeve 188 may be removed for repairs. Each of the sleeves 188 is provided with a ridge 189 slightly below its rim 190 which is disposed above the top plate 114 of the plenum chamber 44, and the ridge 189 abuts the upper end of one of the tubes 126 of the plenum chamber 44. A pair of spaced channels 192 are disposed in the sleeve 188 adjacent to the ridge 189 and sealing rings 194 are disposed in the channels 192 to form a watertight seal between the sleeve 188 and the adjacent tube 126 of the plenum chamber 44.

Figure 14:
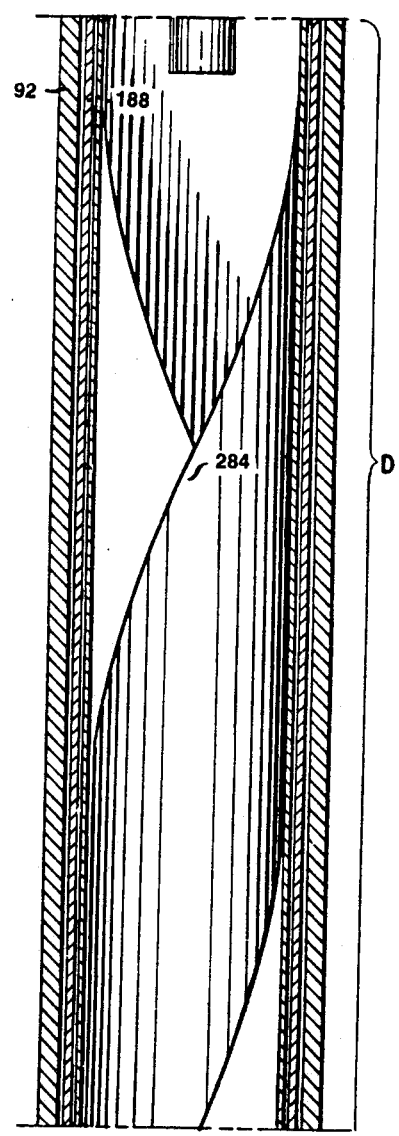
FIG. 14 is a vertical sectional view of the upper portion of the fuel element illustrated in FIG. 12.

Each fuel element 146 may be considered as having six different portions designated A, B, C, D, E and F in the drawings. The portion A is called the end access portion, and this portion extends above the top plate 114 of the plenum chamber 44. The adjacent portion "B" is the plenum chamber portion and extends from the top plate 114 of the plenum chamber to the bottom plate 116 thereof when the fuel element is in the reactor. The portion "C" extends from the bottom plate 116 of the plenum chamber to the top plate 88 of the top shield 42 and may be termed the gas plenum portion of the fuel elements 146. The portion "D" which is called the top shield portion extends from the top plate 88 to the bottom plate 86 of the top shield 42, and is illustrated in FIGS. 14 and 15. The portion "E" is the "fuel portion" of the fuel element and extends from the bottom plate 86 of the top shield 42 through the fuel region of the reactor, and the "F" portion of the fuel element is called the "tip portion" and extends from the fuel portion "E" to the bottom end of the fuel element 146.

Figures 12, 13:
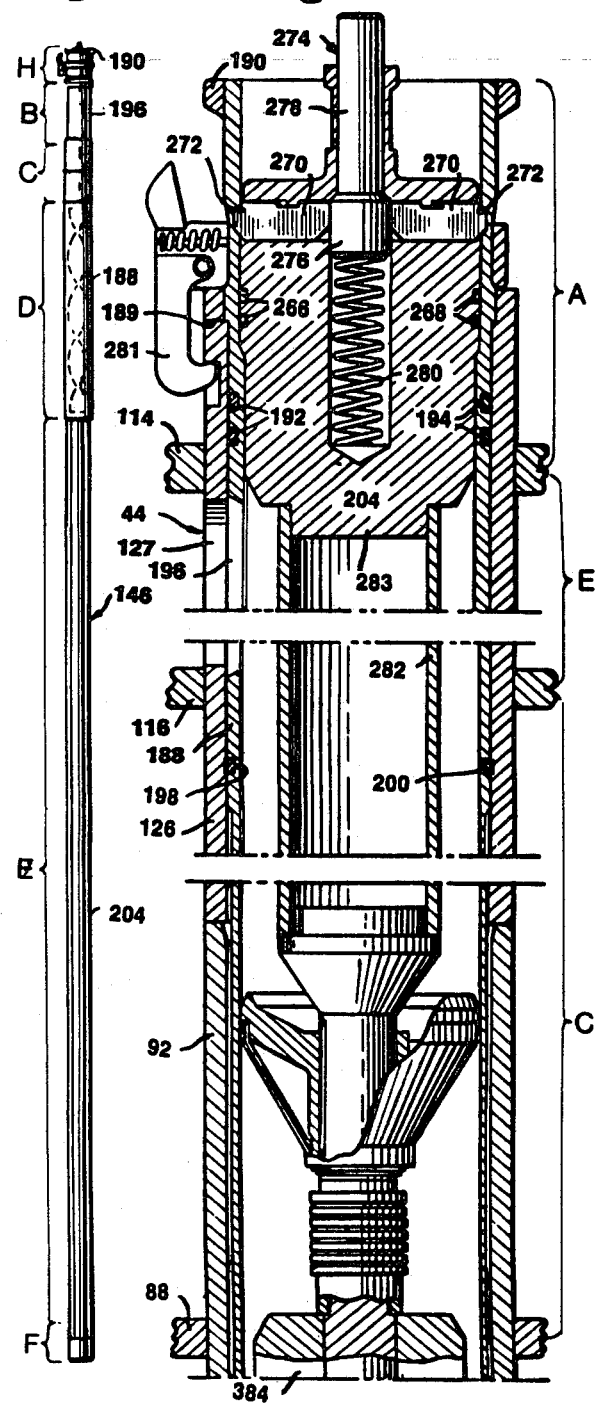
FIG. 12 is an elevational view of one of the fuel elements of the reactor illustrated generally in FIG. 3.
FIG. 13 is a vertical sectional view of the upper portion of the fuel element illustrated in FIG. 12.

As explained above, the sleeve 188 extends through portions A, B, C, and D, and terminates adjacent to the fuel portion "E". Each sleeve 188 is provided with three apertures 196 in the plenum chamber region "B", these apertures being spaced by 120° and aligning with the apertures 127 in the tubes 126 in the plenum chamber 44, as illustrated in FIG. 13. A transverse groove 198 is disposed in the sleeve 188 in the gas plenum region "C" adjacent to the plenum region "B" and a spacing ring 200 is disposed in the groove 198. The sleeve 188 is also provided with an inwardly extending shoulder 202 adjacent to its lower end and the end of the tube 92 of the upper shield 42. The fuel portion "E" of the fuel element 146 is translatable through the sleeve 188, and may be withdrawn from the reactor through the rim 190.

The nuclear fuel for the reactor is disposed within a fuel channel housing 204 which is secured to a top fitting 206 capping the housing 204. The top fitting 206 is provided with an outwardly extending shoulder 208 which abuts against the shoulder 202 on the sleeve 188, thereby suspending the fuel housing 204 within the reactor 25. The fuel housing 204 is provided with four annular parallel channels 210, equally spaced.

Adjacent channels 210 are separated by a common wall portion 212, and there is a generally rectangular passage 214 between the four channels 210. Each of the channels 210 is provided with three ribs 216 which space fuel elements or slugs 217 containing cylindrical bodies 218 consisting of uranium with the isotopic abundance found in nature centrally within the channels 210, the slugs 217 being provided with jackets 220 to protect the uranium from corrosion by the coolant fluid. Each of the fuel housings 204 has walls 222 between the channels 210 and the adjacent body of heavy water within the reactor, these walls extending into the top fitting 206 and being secured thereto. The channels 210 of the fuel housings 204 also extend through the top fitting 205, as will be further described below.

The top fittings 206 are constructed in two sections, a lower section 224 and an upper section 226. The upper section 226 is provided with a peripheral groove 228 in which is disposed a sealing ring 230 for preventing leakage of coolant from the interior of the fuel element 146. A shaft 232 is anchored in the upper section 226 of the top fitting 206 and extends above the top fitting 206 terminating in a hanger 234 for removing the fuel housing 204 from the fuel element 146. The upper section 226, shaft 232 and hanger 234 are constructed of type 304 stainless steel, while the lower section 224 and the other portions of the fuel housing 204 in the fuel region "E" are constructed of aluminum because of its smaller thermal neutron capture cross section. The lower section 224 of the top fitting 206 is provided with a longitudinal groove 236 confronting the sleeve 188 which accommodates a key 238 extending outwardly from the sleeve 188 adjacent to its shoulder 202 to orient the fuel housing 204.

Each of the channels 210 extends through the top fitting 206 and a hollow cylinder 240 is slidably disposed in the mouth 241 of each of the channels 210. Each of the cylinders 240 is provided with a cap 242 which has a rim 244 which abuts against the top of the fitting 206. The caps 242 are also provided with a row of orifices 246 disposed adjacent to the peripheries thereof, the diameter of the orifices being selected to limit the flow of coolant through the particular fuel housing 204 to a desirable magnitude. An axial shaft 248 is attached to the cap 242 of each of the cylinders 240 and extends through the top fitting 206. A bob 250 is attached to the opposite end of the shaft 248 adjacent to the fuel slugs 217. Each bob 250 is provided with a peripheral recess 252 which permits the bob 250 to be disposed within an indentation 253 in the end of the confronting fuel element 217a in alignment with one of the channels 210. Each bob 250 abuts the adjacent fuel element 217a.

Since the cylinders 240 are slidably disposed within the top fitting 206, expansion of the fuel slugs 217 will merely cause the cylinders 240 to rise in the channels 210 and will cause the rim 244 of the cylinders 240 to move away from the upper section 226 of the top fitting 206, as illustrated.

The fuel slugs 217 extend to a bottom fitting 254 of each fuel element 146 which fitting is disposed in region "F". The bottom fitting 254, although of rectangular cross section, has a cylindrical aperture 256 at the bottom thereof which is slidably disposed about the head 152 of the adjacent centering pin 51. The bottom fitting 254 is also provided with a plurality of orifices 258 which permit the coolant to exit from the fuel element 146. The bottom fitting 254 is attached to the lower end of the fuel housing 204 by means of a rim 260 extending up into the channels 210 of the fuel channel housing 204. Downwardly tapering, coolant flow directing members 262 are disposed within the channels 210 abutting the rims 260, the flow directing members 262 also abutting the fuel elements 217 and preventing the fuel elements 217 from sliding downwardly in the fuel housing 204. Since the bottom fitting 254 is slidably disposed about the centering pin 51, expansion or contraction of the fuel element 146 will not produce stresses or strains.

A plug 264 is disposed within the sleeve 188 adjacent to the rim 190 of the fuel element 146. The plug 264 is provided with a pair of transverse grooves 266 adjacent to the ridge 189 on the sleeve 188, and a pair of sealing rings 268 which are disposed within grooves 266 to prevent leakage of coolant between the plug 264 and the sleeve 188. The plug 264 is prevented from being forced out of the sleeve 188 by four spaced locking bars 270 which are forced into slots 272 in the inner surface of the sleeve 188 between the ridge 189 and the rim 190. The bars 270 are maintained in position by a plunger 274 which is provided with an expanded region 276 and a contracted region 278. A helical spring 280 maintains the expanded region 276 in contact with the bars 270 to lock the plug 264 to the sleeve 188 except when the plunger 274 is forced against the spring 280 by a downward force applied thereto. A spring biased latch 281 is attached to the sleeve 188 and locks the sleeve 188 to the tube 126. A cylindrical coolant flow deflecting member 282 which is attached to a hub 283 protruding from the surface of the plug 264 extends downwardly from the plug 264 through the plenum region "B" and into the intermediate region "C" of the fuel element 146. A spiral shield 284 is connected to the flow deflecting member 282 and extends to the hanger 234 of the fuel channel housing 204 to prevent turbulence in the flow of coolant through the upper shield region "D" of the fuel element 146 and to prevent radiations from emanating through the top of the fuel element 146.

There are eighty fuel slugs 217 in each of the fuel elements 146 in the reactor 25, a total of twenty fuel slugs per channel 210. Each of the fuel slugs 217 has a diameter of approximately 1.08 inches, a length of approximately 8.42 inches, and contains the body 218 consisting of uranium with the isotopic content found in nature, the body 218 having a diameter of 1.00 inch, a length of 8.070 inches, and a weight of approximately 1975 grams. The jacket 220 of the fuel slug 217 is constructed of aluminum and has a thickness of approximately 0.04 inch. Each of the fuel elements 146 contains 342.4 lbs. of uranium.

The fuel housing 204 has a maximum cross sectional diameter of approximately 3 23/64 inches and is constructed of aluminum. Adjacent fuel elements 217 are disposed 1.38 inches between centers, making opposite fuel elements 217, in each fuel housing 204, two inches between centers. Each of the channels 210 within the housing 204 has a diameter of approximately 1¾ inches and a wall 222 thickness of approximately 1/16 inch. The common wall portions 212 between adjacent channels 210 also have a minimum thickness of approximately 1/16 inch, and the minimum distance across the central passageway 214, which is measured on a line traversing the axes of the channels 210 on opposite sides of the passageway 214, is approximately ½ inch. The ribs 216 within the channels 210 are approximately ⅛ inch high. In the fuel region "E" of the fuel element 146, the ratio of aluminum to uranium is 0.075 by weight.

In the particular reactor described the fuel elements 146 are 21 ft. 1½ inches long, and extend above the top plate 114 of the plenum chamber 44 by a distance of approximately 6 inches. The apertures 196 in the fuel elements 146 are in the form of slots approximately 8¾ inches long and approximately 1 inch wide. The plenum chamber region "B" approximately 10¾ inches long and encompasses the plenum chamber 44 of the reactor. The intermediate portion "C" is approximately 12¾ inches long, the upper shield portion "D" is approximately 48 inches long, the fuel region "E" is approximately 168 inches long, and the lower tip region "F" is approximately 8 inches long. The diameter of the top fitting 206 of the fuel housing 204 is 3.725 inches.

Figure 25:
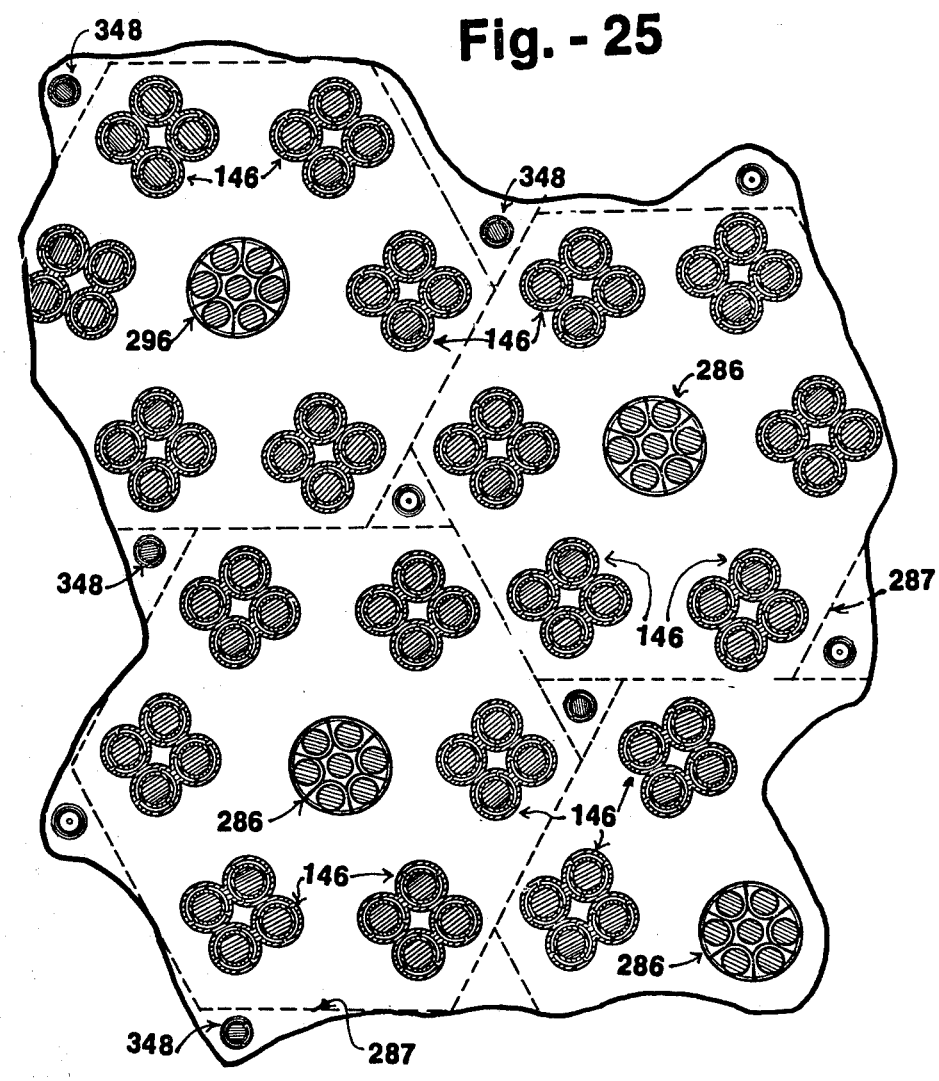
FIG. 25 is a fragmentary enlarged sectional view of a portion of the core of the reactor taken along the line 25—25 of FIG. 3.
Figure 26:
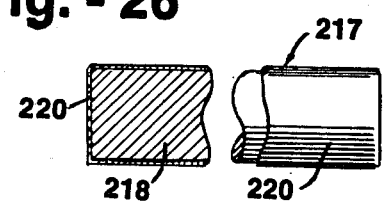
FIG. 26 is a view of one of the fuel elements of the reactor, a portion thereof being taken along the line 26—26 of FIG. 15.
Figure 29:
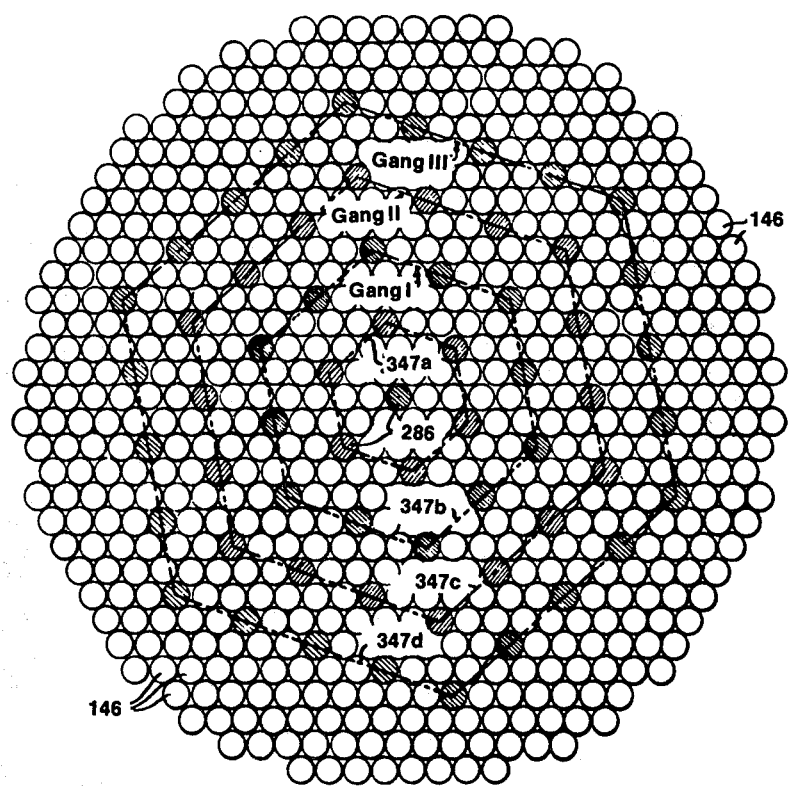
FIG. 29 is a schematic diagram of the lattice of the reactor showing the distribution of the control elements among the fuel elements.

A series of control elements 286 are disposed in the tubes 126 extending through the plenum chamber 44, tubes 92 of the upper shield 42, and abut tubes 50 of the bottom shield 34. As indicated in FIGS. 25 and 29, the control elements 286 are parallel and equally spaced from each other throughout the reactor tank 32, the control elements 286 being spaced by a distance of approximately 18.5 inches between centers. Six fuel elements 146 are disposed equally about each of the control elements 286 and together with the control element 286 form a hexagonal lattice system with a spacing of 7 inches between all centers. It is thus clear, that the fuel elements 146 are disposed in a plurality of hexagonal blocks designated 287, adjacent blocks 287 having no common side, and the fuel elements 146 in adjacent blocks 287 being spaced by the same distance as the spacing between the fuel elements 146 within each block 287.

The control elements 286 are illustrated in detail in FIGS. 17, 18, 19 and 20. The control elements 286 are provided with a sleeve 288 which extends through the tubes 126 of the plenum chamber 44 and the tubes 92 of the top shield 42 to terminate adjacent to the lower end of the tubes 92. It will be noted that each sleeve 288 corresponds to the sleeve 188 of the fuel element 146, and is constructed in the same manner as the sleeve 188 except that the apertures 196 in the plenum chamber region "B" of the fuel elements 146 are omitted from the sleeve 288 of the control element 286. The sleeve 288 is provided with a flange 290, a rim 292, grooves 294 for sealing rings 296 and a shoulder 298 adjacent to the bottom plate 86 of the top shield 42, in the same manner that the fuel element sleeve 188 is provided with ridge 189, rim 190, channels 192 for sealing rings 194 and shoulder 202. Each sleeve 288 is normally disposed within the plenum chamber 44 and the top shield 42 of the reactor, the other portions of the control element 286 being removable through the sleeve 288. A control rod housing 299 extends downwardly from each sleeve 288 and rests upon a shoulder 298 which is disposed adjacent to the end of the sleeve 288.

Each control rod housing 299 is constructed of aluminum by an extrusion process and is provided with seven elongated compartments 300a, 300b, 300c, 300d, 300e, 300f, and 300g, six of the compartments being disposed about the periphery of the control rod housing 299 and the seventh compartment 300g being disposed on the axis thereof. Each of the peripheral compartments 300a, 300b, 300c, 300d, 300e, and 300f is formed by an outer cylindrical wall 302 of the control rod housing 299 and a curved wall 304 with ends terminating at the cylindrical wall 302. The central compartment 300g is formed by the curved walls 304, and is thus generally shaped in the form of a six-pointed star. The seven compartments 300a, 300b, 300c, 300d, 300e, 300f and 300g contain translatable control rods 306a, 306b, 306c, 306d, 306e, 306f and 306g, respectively.

A shoulder fitting 308 is attached about one end of the control rod housing 299 and is provided with a shoulder 309 which confronts the shoulder 298 on the sleeve 288 and prevents the control rod housing 299 from falling out of the sleeve 288. A cylindrical shield muff 310 is also disposed within the sleeve 288 and extends from the shoulder fitting 308 along the inner surface of the sleeve 288 to the flange 290. Guide plates 311 are mounted within the shield muff 310 parallel to the axis of the sleeve 288 and are disposed at intervals along the axis thereof. The guide plates 311 are provided with apertures 312 which are aligned with the compartments 300a, 300b, 300c, 300d, 300e, 300f, and 300g in the control rod housing 299. The guide plates 311 are constructed of stainless steel and form a shield to prevent the escape of radiation through the sleeves 288. Gaps 314 are disposed between adjacent guide plates 311, and these gaps 314 are filled with heavy water when the control elements 286 are disposed within the reactor tank 32, thus forming moderating sections for slowing neutrons to energies which are readily absorbed by the guide plates 311.

A bottom connector 316 is disposed at the lower end of each of the control rod housings 299, and each of the connectors 316 fits about the upwardly extending end of one of the pipes 52. Each pipe 52 protrudes rather snugly into the open end of the bottom connector 316 and connects the control element 286 to a source of heavy water, as illustrated in FIG. 3. The pipes 52 are also sealed within the tubes 50. A stop plate 320 extends transversely across the bottom connector 316 adjacent to its point of junction with the control rod housing 299, and supports cup-shaped stops 322 which are disposed adjacent to the compartments 300a and 300g of the control rod housing 299. The stop plates 320 are also provided with orifices 324 to permit coolant water to flow upwardly therethrough into the seven compartments of the control rod housing 299. A plurality of apertures 326 are provided in the cylindrical wall 302 adjacent to the shoulder fitting 308 of the control rod housing 299. As a result, coolant water may flow through the control rod housing 299 and exit through the apertures 326.

As stated above, seven control rods 306a, 306b, 306c, 306d, 306e, 306f and 306g are disposed within the sleeve 288 and control rod housing 299, one control rod being in each of the seven compartments of the control rod housing 299. In each of the control elements 286, the control rod 306g in the central compartment 300g and the control rod 306a in the peripheral compartment 300a are substantially shorter than the fuel elements 146 or the other control rods and are generally called "half rods". Both of the control rods 306a and 306g are constructed of an allow of lithium and aluminum. The control rod 306b adjacent to the rod 306a is a full-length rod and is constructed of cadmium, while the adjacent rod 306c is a full-length lithium-aluminum rod. Adjacent to the lithium-aluminum rod 306c is a second full-length cadmium rod 306d, and the remaining rods 306e and 306f in the control rod housing 299 are full-length lithium-aluminum rods. Each of the control rods is attached to a drive shaft 330 disposed within the shield muff 310 and is translatable through the guide plates 311. The drive shafts 330 are constructed of stainless steel and are attached to the control rods 306a, 306b, 306c, 306d, 306e, 306f and 306g by pins 332 which traverse extensions 334 at the end of each of the control rods. A hanger 336 is attached to the drive shaft 330 and extends through the sleeve 288 to the rim 292 thereof.

Each of the control rods 306a and 306g has a tube 338 extending from a base 340 which, in the fully inserted position of the rod, abuts the adjacent stop 322, to a plug 342 which terminates in the extension 334. Each of the other control rods 306b, 306c, 306d, 306e and 306f has a tube 338a which extends from a conical base 340a to a coupler 341 which attaches the sleeves 338a to the hangers 336. Neutron absorbing bodies 344 are disposed within the tubes 338. In the case of the full-length rods 306b and 306d the bodies 344 are constructed of cadmium and completely fill the tube 338. In the case of the full rods 306c, 306e, and 306f, the bodies 344 are constructed of a lithium-aluminum alloy and completely fill the tubes 338. In the case of the two half rods 306a and 306g, a sleeve 346 extends from the bodies 344 of lithium-aluminum alloy to the plug 342. The table below sets forth the dimensions of the control elements 286.

| CONTROL ELEMENT 286 DIMENSIONS | |
|---|---|
| Total length | 261 ½ in. |
| Length of sleeve 288 | 69 ½ in. |
| Length of control rod housing 299 (from end of sleeve 288 to bottom connector 316) | 176 in. |
| Outside diameter of sleeve 288, approximately | −4 ⅞ in. |
| Diameter of control rod housing 299, approximately | −3 ⅞ in. |
| Diameter of tubes 338 | 0.940 in. |
| Length of tubes 338 | 14 ft. |
| Length of bodies 344 | 10.14 in. |
| Diameter of bodies 344 | 0.808 in. |
| Composition of lithium-aluminum bodies 344 | 3.5% lithium 96.5% aluminum |
| Diameter of canned bodies 344 | 0.860 in. |
| Length of canned bodies 344 | 10.66 in. |
| Weight of lithium-aluminum bodies 344 | 0.424 lb. |
| Number of lithium-aluminum bodies in full-rod | 16 |
| Number of lithium-aluminum bodies 344 in half-rod | 8 |
| Number of lithium-aluminum full-rods 306c 306e and 306f in control rod housing | 3 |
| Number of lithium-aluminum half-rods 306a | |

| CONTROL ELEMENT 286 DIMENSIONS | |
|---|---|
| -continued | |
| and 306g in control rod housing 299 | 2 |
| Total lithium-aluminum bodies 344 in reactor | 3,904 |
| Diameter of cadmium control rods 306b and 306d | 0.860 |
| Length of cadmium control body | 14 ft. |
| Cadmium rods in each fuel housing 299 | 2 |
| Total cadmium control rods 306b and 306d in reactor | 132 |

One control element 286 is positioned along the central axis of the lattice reactor, as shown in FIG. 29, and the other control elements 286 are arranged about this control element in hexagonal concentric arrays, the first array 347a having 6 control elements 286, the second array 347b having 12, the third array 347c having 18, and the fourth and final array 347d having 24 control elements 286. Each array is equally spaced from adjacent arrays.

The control rods 306 may be individually positioned within the reactor, but in practice it is found to be more convenient to position the control rods, which occupy similar positions in their respective control elements, in gangs. The central control element and the first two arrays 347a and 347b totaling 19 control elements 286 in all, are interconnected to operate as gang 1, the next 18 control elements 286 in the third array 347c constitute gang 2, and the 24 control elements 286 in the fourth array 347d constitute gang 3. The mechanism by which the gangs are positioned will be set forth hereinafter.

Ideally, each of the fuel elements 146 would generate the same amount of power. However, in an unflattened reactor, the power production is a maximum at the center of the active portion and decreases towards the perimeter of the active portion of the reactor. By using a large number of control rods grouped in clusters, this undesirable heat distribution is changed to one more closely approximating the ideal, i.e., a flattened neutron density distribution in the central region of the active portion 30. Additionally compensation for an unfavorable heat distribution is achieved by providing the fuel elements 146 with orifices 246 for distributing the flow of coolant heavy water, the orifices 246 in the fuel elements located in the central region of the reactor being larger than those in the fuel elements disposed near the perimeter of the active portion 30 of the reactor.

Also, in an ideal power producing reactor, the fuel elements of the reactor would produce heat uniformly along their surfaces and uniform cooling would be provided to all portions of the fuel element. However, it is not possible to provide uniform cooling to all portions of the fuel elements. In this reactor, the coolant flow enters through the top of the fuel elements 146 and flows downwardly between the fuel elements 217, thus providing maximum cooling in the regions adjacent to the top of the fuel elements 146. By using half-rods 306a and 306g, which are distributed throughout the reactor active portion 30, the axial heat distribution is altered. The half-rods 306a and 306g are maintained beneath the center of the active portion 30 of the reactor to depress the flux in the lower half of the reactor, thereby shifting the maximum flux to the upper portion of the reactor 25 where the maximum cooling is available. In the particular reactor here described, an increase in allowable power of about 10% is achieved in this manner. As the full-rods 306b, 306c, 306d, 306e and 306f are moved to compensate for changes in over-all reactivity, it becomes necessary to re-position the half-rods in order to maintain the optimum axial distribution of the neutron flux.

As will be illustrated later, the five full-rods 306a, 306c, 306d, 306e and 306f are partially inserted into the reactor, these rods may be partially withdrawn or further inserted into the reactor in a sequence to compensate for reactivity changes. The degree of insertion of the full-rods is determined by the amount of flux flattening that is desired at their particular location in the active portion 30 of the reactor. Also, due to the fact that in preferred operational methods only one of the five full-rods in each control element 286 is translated at a time, the change in the axial flux distribution as a result of this control is minimized. In the particular reactor described, the power level of the reactor would have to be reduced as much as 35% as a result of local perturbations in neutron flux density if the five full length rods were replaced by a single control rod with five times the strength of any one of the full rods.

Two lattic arrangements can be distinguished within the reactor 25 in FIG. 29. In a central area, comprising 65% of the reactor active portion 30, every seventh position is occupied by a control element 286 appropriately termed a septifoil.

The septifoil positions are chosen so that each septifoil is surrounded by six fuel elements 146, appropriately called quatrefoils, situated at the vertices of a hexagon (FIG. 25). This lattice arrangement is referred to as the "flat zone" lattice or FZ lattice. This name has been chosen because the radial distribution of neutron flux in the active portion 30 of the reactor during normal operation is approximately constant or flat over a large portion of the area occupied by the FZ lattice. The second lattice arrangement, which occupies the outer 35% of the active portion 30 of the reactor, is referred as the "buckled zone" or BZ lattice. In this region the neutron flux decreases rapidly with increasing radius. The BZ lattice is characterized by the presence of a quatrefoil at each position in the lattice and by the absence of control septifoils 286.

As was indicated before, the sixty-one control septifoils 286 are located in a pattern of concentric hexagons, that is, the central septifoil is surrounded by successive hexagonal arrays 347a, 347b, 347c and 347d containing 6, 12, 18, and 24 septifoils, respectively. The nineteen control assemblies comprising the central septifoil plus the first two hexagonal arrays are operated together as Gang I; the next ring of eighteen assemblies, Gang II; and the outer ring of twenty-four assemblies, as Gang III. Provision is made to modify this arrangement of gangs if this becomes desirable.

The central 222 fuel elements 146 generate an equivalent amount of heat, and this region is known as the flattened "zone" of the active portion 30 of the reactor. The 144 fuel elements 146 surrounding the flattned zone of the reactor are in a region of slowly decreasing neutron flux with increasing radius from the center of the active portion 30 of the reactor, and this region has been termed the "intermediate" zone. The outermost zone contains 240 fuel elements 146 and is a region of rapidly decreasing neutron flux density with increasing radius from the center of the active portion 30 of the reactor. This zone has been termed the "buckled" zone. A flux distribution of this type is obtained by adjusting the control rods in the central zone so that the effective multiplication constant ($k_{eff}$) is unity for a net radial neutron leakage of zero. The control rods in the intermediate zone are then adjusted to keep the whole reactor at criticality. With a proper balance, the intermediate zone will feed as many neutrons to the flattened zone as leak from it, thus keeping the radial flux constant throughout the flattened zone. The buckled zone will feed enough neutrons to the intermediate zone to have some leveling effect on the flux there. This flux distribution permits the use of a power level 75% higher than is possible with conventional cosine flux distribution of cylindrical reactors.

The reactor 25 is also provided with safety elements 348 in the form of rods distributed throughout the active portion 30 of the reactor as shown in FIG. 25. Each safety element 348, as illustrated in FIGS. 8–11, is provided with a thimble 350 which extends vertically through the plenum chamber 44, the top shield 42, and the reactor tank 32, to the top plate 48 of the bottom shield 34. Perforations 351 are disposed in the thimble 350 to permit the heavy water moderator to fill the thimble when the safety rod is withdrawn from the reactor in order to improve the reactivity of the reactor and act as a snubber when the safety element is inserted into the reactor. A sleeve 352 is disposed about the thimble 350 and in gas-tight contact therewith, and the sleeve 352 extends through the plenum chamber 44 of the reactor. The sleeve 352 is also provided with a shoulder 354 adjacent to the bottom plate 116 of the plenum chamber 44. The plenum chamber 44 is provided with tubes 356 which fit about the sleeves 352 of the safety elements 348 and are provided with restricting shoulders 358 adjacent to the bottom plate 116 of the plenum chamber 44 which shoulders of the shoulders 354 of the sleeves 352. A flange 360 is also disposed about and adjacent to the end of each sleeve 352 and rests upon the end of the adjacent tube 356. The sleeve 352 is provided with a pair of grooves 362 in the plenum chamber region 44 adjacent to the top plate 114, and sealing rings 364 are disposed therein to prevent the leakage of coolant between the tubes 356 and the sleeves 352. The top shield 42 is also provided with tubes 366 surrounding the thimble 350, the tubes 366 extending from the top plate 88 of the top shield 42 through the plate 94 thereof. A cup 368, as shown in FIG. 21, is secured to the top of plate 48 confronting the safety elements 348. The thimble 350 is provided with a plug 370 which tapers down to a safety thimble tip 372 to form a closed end.

Each safety element 348 is provided with a cylindrical neutron-absorbing sleeve 376 which is disposed tightly about a solid rod 377 and which is translatably disposed within the thimble 350. An outer cylindrical sheath 378 which terminates in a conical shaped tip 379 is secured to the neutron-absorbing sleeve 376. The neutron-absorbing sleeve 376 consists of cadmium sheet with a thickness of 0.050 inch and a length of 14 feet and is attached to a shaft 382. The rod 377 is constructed of stainless steel with a diameter of 0.750 inch, and is extended by a stainless steel shaft 382. The shaft 382 is connected through a threaded member 382a to a shaft extension 384 by a pin 386 which extends through the shaft extension 384 and the member 382a. A hanger 388 is disposed at the end of shaft extension 384. The sheath 378 is constructed of aluminum 0.040 inch thick.

The reactor 25 is provided with 66 safety elements 348 disposed in a triangular lattice throughout the active portion, as illustrated most clearly in FIG. 25. Each of the safety elements 348 is disposed on a central axis which is equidistant from three adjoining control elements 286. One of the control elements 286 is disposed vertically along the central axis of the reactor tank 32, and three safety elements 348 are disposed between this central control element 286 and the six control elements 286 which immediately surround it. A total of nine safety elements 348 are disposed between these six control elements 286 and the adjacent hexagonal control element array which includes twelve control elements 286. Hence, a total of 13 safety elements 348 are found within the area occupied by arrays 347a and 347b. Fifteen safety elements 348 are disposed between the hexagonal array 347b and the next outer hexagonal array 347c of control elements 286, which array includes eighteen control elements 286. Between the hexagonal array 347c and the outermost hexagonal array 347d of control elements 286, there are distributed twenty-one safety elements 348, and a total of eighteen safety elements 348 are uniformly distributed between this outermost hexagonal array 347d of control elements 286 and the periphery of the active portion 30 of the reactor 25. The three inner arrays 347a, 347b and 347c of control elements 286 are disposed in the flattened flux portion of the reactor, which also includes the two hundred and twenty-two fuel elements 146 which surround these control elements 286.

FIG. 1 illustrates the mechanism which is used to position the control rods 306a, 306b, 306c, 306d, 306e, 306f and 306g, and the safety elements 348. The reactor supporting structure 29 is provided with a tower 390 which rises above the reactor 25 a distance of approximately 149 feet 6 inches. All of the equipment for controlling the position of the control rods 306a, 306b, 306c, 306d, 306e, 306f and 306g, and the safety elements 348 are disposed above the sixty-six foot level, designated 392, away from any possible harmful effects of radiation emanating from the reactor 25. A series of motors 394 which actuate the safety elements 348 are disposed approximately 130 feet above the reactor and near the top of the tower 390. At a level of approximately 120 feet above the reactor and immediately below the motors 394 are a series of control rod drive motors 396. Telescoping tubes 398 connect both the control elements 286 and the safety elements 348 to their respective motors 396 and 394, and a plurality of guides 400 are mounted within the supporting structure 29 to guide the telescoping tubes 398 and assure smooth translation of these tubes.

Since the reactor fuel and other materials which are irradiated, are to be withdrawn through the top of the reactor 25, it is necessary to disconnect the tubes 398 from their respective control elements 286 and safety elements 348 for loading and unloading operations. Each of the rods 398 is attached to the hanger 336 or 388 of the control element 286 or the safety element 348, respectively, by a releasable latch mechanism 401, illustrated in FIG. 3, such as that disclosed in the patent application of Robert L. Menegus and Richard L. Akers, Ser. No. 440,577, filed June 30, 1954, entitled "Releasable Holder for Rod" now U.S. Pat. No. 2,794,670. In addition, a guide frame 402 positioned on top of the reactor 25 and secured thereto during reactor operation is removable from the reactor and a lifting hoist 404 adjacent to the top of the tower 390 of the reactor supporting structure 29 is attached to the frame 402 and is used to raise the frame 402 to a position adjacent to the sixty-six foot level 392 of the structure 29 when the reactor is to be loaded or unloaded. A track crane 406 is disposed on a level below the sixty-six foot level 392 and may be positioned over any of the elements of the reactor 25 to aid in removing these elements.

If the reactor is brought to criticality by withdrawing all gangs of control elements uniformly, it will be found that the neutron flux is a maximum at the axis of the reactor, and decreases monotonically as a function of distance from the axis. In this situation, the power of the reactor is limited by the maximum temperature that can be sustained by the fuel element at the axis of the reactor, while all other fuel elements operate at the lower temperature.

The present invention provides means to bring a substantial fraction of all fuel elements up to the maximum temperature that they can sustain, and so greatly increases the power output of the reactor as a whole. In a typical case, after the reactor has been brought to the power level that can be obtained by withdrawing all gangs uniformly, this improvement is obtained by inserting control rods into Gangs I and II and withdrawing them from the Gang III, in such a way that, while the power of the central fuel element remains constant, the power generated in the fuel elements associated with all three gangs is brought up to a value comparable with that being generated in the central fuel element. In other words, the distribution of the neutron flux is modified so that it remains essentially constant for some distance out from the axis, and then falls rapidly to zero near the boundary of the reactor. Consequently, a large number of fuel elements can be operated at maximum power, instead of only one, and the power output of the reactor is substantially increased.

The control element, as indicated hereinbefore, has one or more elongated, neutron-absorbing members having a length substantially less than the effective axial length of the reactor. These short members, commonly called half-rods, are arranged to be moved together in such a way as to distort the axial distribution of the neutron flux to a shape that permits the maximum amount of heat to be removed from the fuel elements that are located in the region of control. The dimensions and materials of construction of these half-rods are so chosen that, in the section of the region of control that they occupy, the buckling is reduced to a value, either positive or negative, that is substantially smaller than the relatively high value of positive buckling that exists in the sections of the regions of control that are either unoccupied or occupied only by the full-rods, be the latter either partially or fully inserted. By these means, it is possible to achieve a controlled system in which a coolant, flowing in a direction parallel to the axis of the control elements, flows successively through (a) a region of high positive buckling in which the production of heat rises rapidly to a high value; (b) a region, occupied by half-rods, that has a relatively low buckling, either positive or negative, at which the production of heat remains relatively constant; and finally (c) a region of high buckling in which the production of heat diminishes rapidly to zero. When the distribution of neutron flux, and consequently the distribution of heat production in the fuel, follows the pattern described above, it is possible to extract substantially more heat from the fuel, without exceeding a limiting temperature either at the surface of the fuel or in its interior, than would be possible if the distribution followed a cosine curve or some arbitrary function.

The half-rods are normally set so that the midpoint of their neutron-absorbing section is downstream, with respect to the flow of the coolant, from the midplane of the reactor. When set in this way, they produce the advantageous type of neutron distribution mentioned above. Like the full-rods, the half-rods can be operated both in gangs and as individuals, so that their influence on the axial distribution of neutron flux can be exerted both on the gross distribution and on the local distribution. The exact position at which the half-rods in a given control element are set in order to achieve an optimum neutron distribution depends on the configuration of the full-rods in said element and on the gang in which said element is located.

After the neutronic reactor 25 has been completed, and the 606 fuel elements 146 inserted into the tank 32, the reactor may be brought to criticality. Initially, all of the sixty-six safety elements 348 are fully disposed within the reactor tank 32, and all of the sixty-one control elements 286 are disposed within the reactor tank 32 with their control rods 306a, 306b, 306c, 306d, 306e, 306f and 306g fully inserted into the reactor 25.

DETERMINING CRITICAL OPERATIONAL CHARACTERISTICS

It is not necessary to circulate the coolant through the reactor in order to determine the critical operational characteristics of the reactor. The reactor tank 32 is filled to any desired level with heavy water ($D_2O$) by opening the valve 134 between the pump 122 and the heavy water reservoir 133 and pumping the required quantity of heavy water through the inlet ports 120, and the fuel assemblies 146. The control elements 286 are also filled with heavy water to the same level as the reactor tank. The top shield 42 is also filled with water ($H_2O$) from the water reservoir 61, as is the lower shield 34. A neutron source is then positioned centrally within the active portion 30 of the reactor to assure a constant supply of neutrons in starting the reactor, as is conventional in the art. This neutron source may be of any conventional type, such as Po-Be neutron source with an emission of $3.44 \times 10^7$ neutrons per second which was used in the following start-up procedure. For example, the neutron source was placed at a height of 213.36 centimeters frm the lowest level of the fuel within a reactor tank such as 32, and approximately 13 inches from the central axis of the tank. The reactor was started at an ambient temperature of 20° C., although virtually any ambient temperature could be tolerated. The heavy water level within the reactor tank 32 was at a height of 459.4 centimeters from the bottom of the tank, and the lowest level of the fuel elements within the tank was 20.31 centimeters above the bottom of the tank. The total travel of the control rods and safety rods in the reactor from their positions of full insertion is approximately 469 centimeters.

In order to determine criticality, ten of the cadmium rods 306d of ten control elements 286 were interconnected by a yoke and moved together remotely. These ten cadmium rods 306b were distributed uniformly throughout the reactor active portion 30. A number of separate efforts to start the reactor were made, after the safety elements 348 were withdrawn, by removing these ten interconnected cadmium rods 306b, then reinserting these rods before removing the first of the half-rods 306a and 306g from all of the control elements 286, then reinserting the ten remote controlled cadmium rods 306d, and continuing the process by removing other rods from the control elements 286 until radiation measurements indicated that the reactor was becoming critical. This process was continued until the reactor achieved criticality, at which time all of the safety elements 348 has been withdrawn from the core of the reactor, all of the half-rods 306a and 306g, and cadmium rods 306b and 306d had been entirely withdrawn from the active portion 30 of the reactor. In addition, lithium aluminum alloy rods 306c were withdrawn a distance of 198 centimeters and all of the lithium-aluminum alloy rods 306e were withdrawn a distance of 146 centimeters. The lithium alloy rods 306f remained fully inserted in the core of the reactor, and the ten remotely operated cadmium rods 306d had been fully withdrawn.

OPERATION OF THE REACTOR

After the critical conditions for the reactor are determined, as outlined above, the power of the reactor is then raised to the desired operating level. The total flow of heavy water ($D_2O$) through the reactor tank 32 is 76,200 gallons per minute to cool the 606 fuel elements 146. In addition, each of the control elements 286 is provided with a flow of heavy water coolant at the rate of 85 gallons per minute, or a total flow of 5200 gallons per minute for the 61 control elements 286 in the reactor. A total flow of approximately 2,000 gallons per minute of light water ($H_2O$) flows through the upper shield 42, lower shield 34, and coolant tanks 67 of the reactor to limit the temperature of these elements. With these coolant flows, the reactor may be operated at a power level of 700 megawatts. Due to the fact that there is a physical transition in uranium at a temperature of 660° C. with a corresponding change in density of nearly 2%, the power output of the reactor is limited to internal metal temperatures below this value for the fuel bodies 218. At operation of 400 megawatts, the internal metal temperature of the fuel bodies does not exceed a maximum of approximately 350° C. There is also a maximum allowable temperature at the surface of the fuel slug 217, since this will determine largely the internal metal temperature of the uranium body 218. In addition, there is a maximum "bath" water temperature at which the reactor may be operated, that is, the temperature of the water in the reactor tank 32. In determining the power level permissible for the reactor described herein, a limit of 90° was set as the maximum allowable sheath temperature for the slugs 217, however, it may be possible to tolerate a temperature in excess of 100° C. without exceeding the permissible uranium body temperature.

Using the same flow rates given above, the reactor is operated at a power level at 150 megawatts, thus leaving considerable cooling margin. After the reactor has been operated a total of about 200 megawatt days, the positions of the control elements 286 are as follows:

All safety elements 348 are removed from the active portion of the reactor.

The lithium-aluminum rods 306f of the central nineteen control elements 286 extend 11.3 feet below the bottom of the deflection plate 110 of the top shield 42; and the half-rods 306a and 306g have their active lengths extending from 5.2 to 12.2 feet below the bottom of deflection plate 110.

The next array of eighteen control elements 286 has lithium-aluminum rods 306f extending 13.9 feet below deflection plate 110; and Half-rods 306a and 306g extend from 5.2 to 12.2 feet below the deflection plate 110.

The outer array of the next twenty-four control elements 286 has lithium-aluminum rods 306f extending to 12.2 feet below deflection plate 110.

All other control element rods are fully withdrawn from the reactor.

Figure 27:
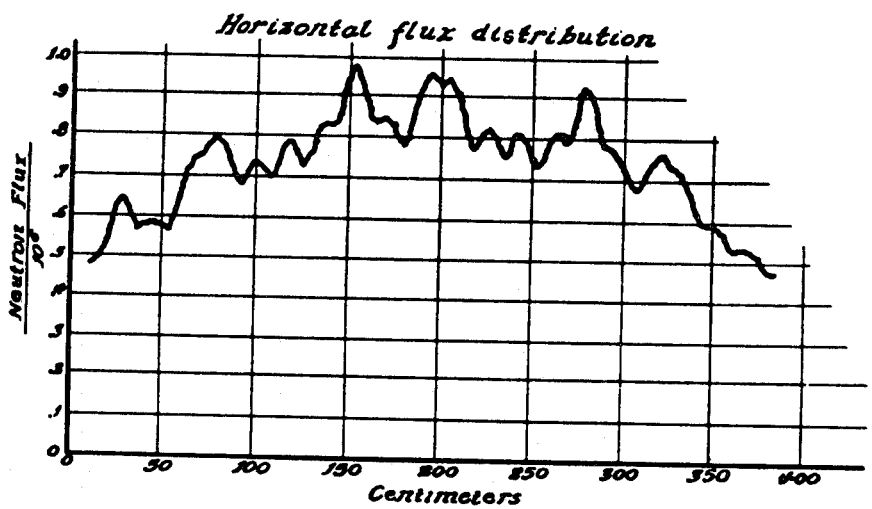
FIG. 27 is a graph showing a horizontal neutron flux distribution through the reactor.
Figure 28:
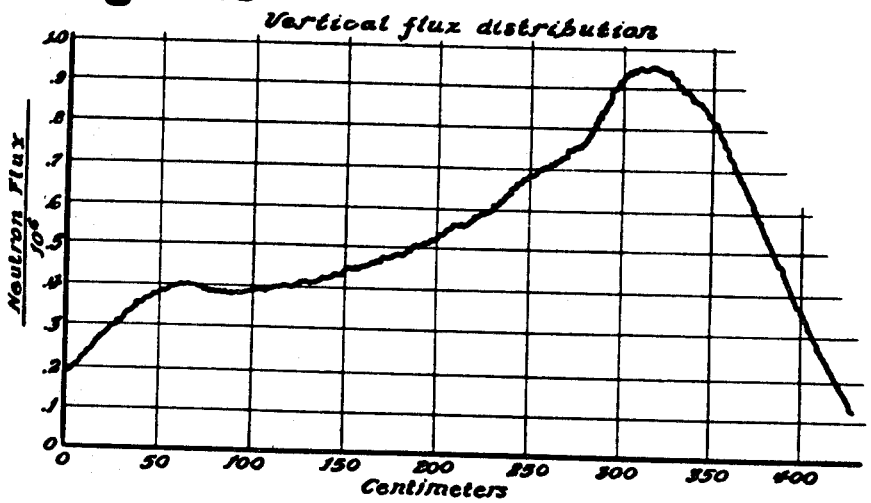
FIG. 28 is a graph showing a vertical neutron flux distribution through the reactor.

FIG. 27 shows the neutron flux distribution, horizontally, across the central portion of the active portion 30 of the reactor, and FIG. 28 shows the vertical flux distribution taken along the central axis of the reactor. While both of these graphs were made at a power level of approximately 10 watts, the forms of the graphs remain the same at higher power levels.

The output of the neutronic reactor, described hereinbefore, is controlled by varying the extent to which the lithium-aluminum bodies 344 within the control rods 306a, 306c, 306e, 306f and 306g are inserted into the reactor, the cadmium rods 306b and 306d being used primarily for shutting down the reactor and keeping it shut down. The cadmium in the control rods 306b and 306d is of sufficient thickness to absorb substantially all the normal neutrons incident thereon and therefore these control rods may be termed "neutron black" rods. On the other hand, the alloy material used in each of the control rods 306a, 306c, 306e, 306f and 306g is sufficiently opaque or black to prevent neutron transmission therethrough and therefore said control rods may be called "neutron grey" rods. Each of the neutron grey rods is made up of the previously described alloy which in the pertinent thickness is capable of absorbing only a portion of incident neutrons. The insertion of the first grey rod in each control element will result in the absorption of a major fraction of the neutrons striking the rod. The effect upon the reproduction factor k of the reactor produced by the insertion of a single grey rod in each control element will be discussed later. It is apparent of course that the composition of the alloy may be varied to obtain different conditions of neutron absorption (greyness) in the grey control rods. Furthermore, the quantity of bodies 344 in each grey control rod may also be varied to achieve flexibility in neutron flux control throughout the entire depth of the reactor. In conclusion, it can be said that flexibility in neutron flux control is achieved by the disposition of various quantities of bodies throughout the active portion of the reactor, said bodies being individually effective to absorb certain of the neutrons impinging thereon to achieve a desired radial and axial neutron flux distribution.

The thermal neutron flux at the center of the active portion of the reactor with the reactor operating at a power level of 378-megawatts is approximately $3.5 \times 10^{13}$ neutrons/cm$^2$—sec. The reactor, when operated at a nominal power level of 378 megawatts, will yield 122 kilograms of plutonium, 180 grams of tritium, and 24322 curies (about 6 grams) of polonium a year. At this rate of production, the reactor requires a consumption of 214 tons of uranium, 1.1 tons of lithium-aluminum alloy, and 1.31 tons of bismuth a year. With all controls withdrawn from the active portion 30 of the reactor, in a cold, unpoisoned condition, the reactor has a $k_\infty$ of approximately 1.137, a $k_\infty$, when hot and poisoned, of approximately 1.103, a resonance escape probability p of approximately 0.854, a thermal utilization of approximately 0.962, a buckling $B^2$ in microbucks of approximately 576, and a diffusion length $L^2$ of approximately 99 centimeters$^2$.

The reactor described above has been illustrated using uranium with the isotopic content found in nature. It is also possible to operate the reactor with a modified fuel in the fuel elements 146 in which uranium, enriched in the $U^{235}$ isotope, is utilized to provide the thermal neutron fissionable material for the reactor. When the reactor is used in this manner, no change is required in the positioning or number of fuel elements 146, or in the number and location of the control elements 286, or in the number of safety elements 348. The reactor is identical in all respects to that described above, except for fuel composition. One of the four channels 210 of the fuel housing 204 is filled with slugs 217 which contain bodies 218 of a lithium-aluminum alloy. This alloy contains approximately 7.4% by weight of lithium, with the balance of aluminum. There are a total of fifteen slugs in this channel 210 extending approximately 159.80 inches in length. The other three channels 210 contain slugs containing 5% by weight of $U^{235}$, 5.35% by weight of alloy, with the balance aluminum, there being 10.9 grams of $U^{235}$ per slug. With this loading, the reactor contains 529 kilograms of $U^{235}$. Operation of the reactor with this fuel loading results in the production of additional tritium from the lithium-aluminum alloy slugs. Other loads containing such proportions of fissionable and absorbing material as to produce a material buckling in the range of 400-900 microbucks can be used in this particular reactor.

In the reactor illustrated in the figures, the unit cells are hexagonal in shape and have cross sectional areas of approximately 1840 $cm^2$. The volume ratio of $D_2O$ to uranium is approximately 13 in the buckled zone and 15 in the flat zone. Under these conditions, k is 1.137 using the four 1-inch diameter uranium rod construction illustrated. The multiplication factor k may be increased by changing this construction to four $\frac{3}{4}$-inch uranium rods spaced the same distance from the axis of the fuel elements as in the present construction even though the ratio of heavy water to uranium is greatly increased.

The advantages obtained from uniform radial and axial neutron flux distributions can be realized from perusal of the brief mathematical dissertation set out hereinafter. For a more elaborate treatment of the mathematics involved on the reactor physics and technology, reference should be made to the following:

AECD-3645 "The Reactor Handbook", vol. I, TID, U.S.A.E.C., 1955

AECD-3646 "The Reactor Handbook", vol. 2, TID, U.S.A.E.C., 1955

Glasstone, S. et al., "The Elements of Nuclear Reactor Theory " D. Van Nostrand Co., Inc., 1952.

Flux Distribution in a Unit Lattice Cell at Criticality

To determine, experimentally, the flux distribution within a lattice cell, several such cells are placed in a reactor, or in an exponential pile, as discussed by Glasstone and Edlund in "The Elements of Nuclear Reactor Theory", D. Van Nostrand Co., Inc., New York, 1952. Most of the calculations of the flux distribution within the lattice cell have been made by means of the simple diffusion equation:

$$D\nabla^2\phi - \Sigma_a\phi + s = 0$$

where $\phi$ represents the thermal neutron flux at any point in the uranium, and D and $\Sigma_a$ are the corresponding diffusion coefficient and macroscopic absorption cross section, respectively. In this equation, the source term, s, is assumed to be zero in the uranium and a constant in the moderator. Although simple diffusion theory does not apply rigorously to regions as small as a lattice cell, it yields a useful approximation. The geometry of the reactor lattices described herein makes an analytical solution difficult or impossible. The "microcell" method of geometrical approximation is one method of obtaining a solution for the neutron flux in a closed form. A microcell is a square cell having a side equal to the spacing between two adjacent rods in the quatrefoil. It has a uranium fuel rod at its center. It is replaced for purposes of calculation by a right circular cylinder of equal cross sectional area. Two sides of the microcell border on other microcells in the quatrefoil, while the other two sides face an effectively infinite amount of moderator. The scattering and absorptive properties of the microcell are obtained first, for zero neutron current at the boundary of the cell, and second, for zero neutron current at a boundary corresponding to several moderator mean free paths. These values are then averaged.

A representation of a quatrefoil is obtained by replacing the actual quatrefoil with a fictitious cylindrical rod of cross section equal to the area of four microcells and having the average properties of a microcell as calculated by the above method.

For calculations in the buckled zone, a quatrefoil and its associated hexagon of moderator are replaced with the fictitious fuel rod and an annulus of moderator. These together occupy a cylindrical cell of area equal to that of the actual hexagonal cell. In the flat zone the repeating unit is the septifoil surrounded by six quatrefoils, as shown in FIG. 25. The quatrefoils and their associated moderator are replaced by an annulus of the same cross sectional area which have the average nuclear properties of a buckled zone cell as calculated above. The central cylinder is assumed to be composed of moderator with a control rod at the center having a cross sectional area equal to that of the number of control rods considered. An additional complication enters the flat zone calculations in that a constant neutron source in the moderator can no longer be assumed. Empirically, a fair approximation to the true source term is made by assuming the source to be a quadratic in r (radius) over the cell with zero slope at the center and extremities. Its magnitude at the center is assumed 90% of that at the extremities. These calculations can be extended to include the aluminum components in the reactor simply by assuming that the aluminum is traversed by the same neutron flux that passed through the replaced moderator.

Flux Distribution Over the Reactor at Criticality

To obtain the over-all flux distribution in the reactor, the actual heterogeneous lattice is assumed to be replaced with homogeneous core material having averaged reactivity, absorption, and scattering properties as indicated hereinabove for the heterogeneous lattices.

Experimentally the flux distribution is determined by neutron monitors or foils at a number of points in the reactor. The results are corrected by appropriate disadvantage factors to give the over-all variation in flux.

The simple diffusion theory equation $$\nabla^2\phi + B^2\phi = 0 \qquad (1)$$

is adequate to calculate the flux distribution although more accurate results are obtained by considering two or more groups of neutrons. The term $B^2$ represents geometrical "buckling" or curvature of the neutron density in a reactor. It is essentially a measure of leakage out of the reactor. For the cylindrical geometry of the previously described reactor, equation (1) may be separated into equations comprising radial and axial components:

$$d^2\phi_z/dz^2 + B_z^2\phi_z = 0 \quad (2)$$

$$d^2\phi_r/dr^2 + 1/r(d\phi_r/dr) + B_r^2\phi_r = 0 \quad (3)$$

$$B^2 = B_z^2 + B_r^2 \quad (4)$$

$$\phi = \phi_r\phi_z \quad (5)$$

which are then solved separately.

For the dimensions and construction of the reactor described hereinbefore, solution of equation (1) led to the following geometrical bucklings:

$$B_r^2 = \left(\frac{2.405}{R}\right)^2 = 91.81 \times 10^{-6}\,\text{cm}^{-2}$$

$$B_z^2 = \left(\frac{\pi}{H}\right)^2 = 47.2 \times 10^{-6}\,\text{cm}^{-2}$$

$$B^2 = B_r^2 + B_z^2 = 139.01 \times 10^{-6}\,\text{cm}^{-2}$$

In the axial direction the solution to equation (1) would normally be $\phi_o \cos(B_z Z)$, but, as is discussed later, the axial flux is deliberately perturbed into a "rooftop" configuration to obtain greater production. Approximate empirical equations for the rooftopped axial distribution are:

$$\phi = \phi_o \sin(0.35z) \qquad 0 \leq z \leq 5 \quad (6)$$

$$\phi = \phi_o(1.29 - 0.0615z) \qquad 5 \leq z \leq 11 \quad (7)$$

$$\phi = \phi_o[0.641 \sin 0.316(15-z)] \qquad 11 \leq z \leq 15 \quad (8)$$

where z is the distance in feet measured from the top of the $D_2O$ level.

In the radial direction, three zones must ordinarily be considered:
(1) A central flattened zone in which the radial buckling is reduced to zero by inserting control rods. This will ordinarily extend to the edge of control gang II with an averaged radius of 150.24 cm.
(2) An intermediate zone of the FZ lattice in which the over-all criticality of the reactor is controlled by inserting or removing control rods. This zone will ordinarily comprise control gang III and will extend from an averae radius of 150.24 cm. to 192.91 cm.
(3) A buckled zone in the buckled lattice wherein, although the fuel does not, on the average, extend past 241.0 cm., the neutron flux in this zone is assumed to extrapolate to zero at 251 cm. to allow for reflection effects.

Application of the usual boundary conditions for zero flux at the extrapolated radius, and for equality of the flux and its first derivative between regions, yields the equations for the three regions $$\phi_1(r) = \phi_o \quad (9)$$

$$\phi_2(r) = \phi_o\left(\frac{J_1(B_2r_1)Y_o(B_2r) - Y_1(B_2r_1)J_o(B_2r)}{J_1(B_2r_1)Y_o(B_2r_1) - Y_1(B_2r_1)J_o(B_2r_1)}\right) \quad (10)$$

$$\phi_3(r) = \phi_2(r_2)\left(\frac{Y_o(B_3r_3)J_o(B_3r) - J_o(B_3r_3)Y_o(B_3r)}{J_o(B_3r_2)Y_o(B_3r_3) - J_o(B_3r_3)Y_o(B_3r_2)}\right) \quad (11)$$

In these equations $J_o$, $J_1$, $Y_o$, and $Y_1$ are Bessel functions, $r_1$, $r_2$, and $r_3$ the outer radii of the three zones, $B_3$ the measured radial buckling of the BZ, and $B_2$ is the radial buckling in the intermediate zone obtained as the solution of the transcendental equation, $$B_2 = B_3\left(\frac{Y_o(B_3r_3)J_o(B_3r_2) - J_o(B_3r_3)Y_1(B_3r_2)}{Y_o(B_3r_3)J_o(B_3r_2) - J_o(B_3r_3)Y_o(B_3r_2)}\right) \times$$

$$\left(\frac{Y_1(B_2r_1)J_o(B_2r_2) - J_o(B_2r_1)Y_o(B_2r_2)}{Y_1(B_2r_1)J_1(B_2r_2) - J_1(B_2r_1)Y_1(B_2r_2)}\right) \quad (12)$$

These equations have been evaluated numerically for an average value of $B_3^2$ equal to $355 \times 10^{-6}\,\text{cm}^{-2}$ to give:

$$\phi_1(r) = \phi_o \quad (13)$$

$$\phi_2(r) = \phi_o[1.96\,Y_o(0.0165r) - 0.533\,J_o(0.0165r)] \quad (14)$$

$$\phi_3(r) = \phi_o[1.50\,Y_o(0.0188r) - 1.47\,J_o(0.0188r)] \quad (15)$$

$$B_2^2 = B_3^2 \times 0.767 = 272.4 \times 10^{-1}\,\text{cm}^{-2} \quad (16)$$

Effects of Flattening the Radial Flux

The power produced in the fuel is very nearly proportional to the average neutron flux in the fuel. The power level of the reactor is limited by the temperature of the hottest fuel rod rather than by the average of the fuel rod temperatures. Radial flattening of the neutron flux to increase the ratio of the average to maximum flux therefore permits the reactor to operate at higher power levels. The magnitude of the gain in permissible power is calculated below for the flattened flux distribution versus the unflattened ($J_o$) flux distribution in the reactor discussed hereinbefore.

For an extrapolated radius of the reactor equal to 251 cm., the distribution of radial flux in a completely unflattened reactor may be written as $$\phi = \phi_o J_o(B_r r) = \phi_o J_0(0.00959r) \quad (17)$$

where $J_o$ is the zero order Bessel function of the first kind. From equation (17), the average radial flux in the flat and buckled zones may be calculated as $$\phi_{FZ\,ave} = \frac{\int_o^{192.91} \phi_o J_o(0.00959r)\,2\pi\,rdr}{\int_o^{192.91} 2\pi\,rdr} = 0.636\,\phi_o \quad (18)$$

$$\phi_{BZ\,ave} = \frac{\int_{192.91}^{241} \phi_o J_o(0.00959r)\,2\pi\,rdr}{\int_{192.91}^{241} 2\pi\,rdr} = 0.1591\,\phi_o \quad (19)$$

where 192.91 cm. and 241 cm. are the average outer radii of the flat and buckled zones, respectively.

If it is assumed that the flux in the fuel is some constant fraction of the average flux (i.e., that the disadvantage factors are the same in the flat and buckled zones), the ratio of the flux in the average fuel rod to that in the hottest rod is given as $$\frac{366 \times 0.636 + 240 \times 0.1591}{606} = 0.442 \quad (20)$$

wherein 366 indicates the number of rods in the flat zone and 240 indicates the number of rods in the buckled zone. Analogously, if equations (13), (14), and (15) are used to represent the flattened flux distribution, the ratio of average to maximum fuel rod powers is found to be 0.771. The increase in allowable power with radial flattening is therefore:

$$0.771/0.442 = 1.75 \text{ or } 75\% \quad (21)$$

Effects of Roof-Topping the Axial Flux

The axial variation in the surface temperature of a fuel rod is given by the equation $$M(T_f(z) - T_{B_o}) = \phi(z) + \frac{2\pi r_f H}{CF} \int_{z_o}^{z} \phi(z) \, dz \quad (22)$$

in which

| | | |
|---|---|---|
| $T_f(z)$ | = surface temperature at z | |
| $T_{B_o}$ | = inlet bulk temperature of $D_2O$ coolant | |
| $\kappa$ | = heat transfer coefficient of film | $= 0.630$ cal/cm$^3$/°C./sec |
| C | = specific heat of $D_2O$ | $= 1.1$ cal/cm$^3$/°C. |
| F | = coolant flow rate | $= 2050$ cm$^3$/sec |
| $r_f$ | = radius of fuel rod surface | $= 1.36$ cm. |
| M | = proportionality constant | |
| $z_o$ | = length of $D_2O$ reflector | $= 0.5$ ft. (15.2 cm) |
| $\phi(z)$ | = power production (watts/cm length of rod) at position z. | |

The power produced per fuel rod is given by the equation $$P = B \int_{z_o}^{z_o + L} \phi(z) \, dz \quad (23)$$

in which L is the length of a fuel rod (14 ft.) and B a proportionality constant. Examination of equations (22) and (23) shows that since the temperature at any point along a fuel rod is limited to 80° C., the maximum power per rod is obtained when $T_f(z)$ is constant and equal to $T_{max}$. Under this restraint $$\frac{d T_f(z)}{dz} = 0 = \frac{d \phi(z)}{dz} + \frac{2\pi r_f H}{CF} \phi(z) \quad (24)$$

$$\phi(z) = A e^{-\frac{2\pi r_f H}{CF}(z - z_o)} \quad (25)$$

Power production with this flux distribution is to be compared with that under the "normal" distribution $$\phi(z) = A' \cos \frac{\omega}{15}(z - z_o) \quad (26)$$

The constants A, A' are evaluated by substituting into equation (22). It is found that 29.8% more power is developed with an "optimum" flux distribution than with the cosine distribution.

The "optimum" distribution is unobtainable since it would require a rather large positive buckling in the reflector. Theoretically, possible distributions in which the flux follows an equation of the form (25) in the middle, but falls off at the ends of the fuel elements as determined by the reactor constants, lead to improvements up to 26.15% above the cosine power.

The axial flux distribution in the reactor can be controlled by positioning the half rods in each control septifoil. It is, however, also affected by the movement of the full rods. Since the full rods are withdrawn one at a time, the reactor is separated vertically into up to four regions determined by the positions of the end of the full rod and the two ends of the ganged half rods. Each region will have a different characteristic buckling. The flux may then be calculated by one-group diffusion theory as $$(d^2\phi/dz^2) + B_z^2 = 0 \quad (27)$$

where $B_z^2$ (the axial buckling) is a step function with values specific for each of the various regions. The value of $\phi$ thus determined may be substituted into (23) to determine the power in the fuel rod for any particular configuration.

The preferred length of the half-rods may be estimated by representing the flat zone as an infinite slab. This procedure is legitimate because there is no radial leakage. The half-rods are intended to reduce the buckling of the central part of this slab to some value that is small (positive, negative, or zero) in comparison to the bucklings that exist above and below this central part of the slab. For the case where the worth of the shorter members is chosen to reduce the buckling of the center section to zero, the preferred length, x, of the shorter members is given approximately by the relation $$x \approx h - \frac{\pi}{2}\left(\frac{1}{B_1} + \frac{1}{B_2}\right) \quad (28)$$

where h is the effective height of the reactor, $B_1$ is the square root of the axial buckling in the region above the shorter members, and $B_2$ is the square root of the axial buckling in the region below the shorter members. The quantitates $B_1$ and $B_2$ are less than the buckling of the uncontrolled lattice because of the full-length control rods that are present during operation.

WORTH OF CONTROL RODS

The effect of the control rods on the nuclear properties of the reactor is most conveniently treated by first considering the effect of a control rod on its individual cell and then by investigating the desired combination of cells. Methods of carrying out this process have been discussed hereinbefore. Table I below gives the multiplication constants of cells containing integral numbers of control rods.

TABLE I
INFINITE LATTICE CONSTANTS

| Lattice considered | k cold, un-poisoned | $\frac{\Delta k}{k}$ (%) | k hot, poisoned | p | f | $B^2$ (micro-bucks) | $L^2$ (cm$^2$) |
|---|---|---|---|---|---|---|---|
| 1" rod, FZ no controls | 1.137 | — | 1.103 | 0.854 | 0.962 | 576 | 99 |
| 1 LiAl | 1.074 | 5.55% | 1.042 | 0.854 | 0.908 | 332 | 90 |
| 2 LiAl | 1.041 | 3.08% | 1.010 | 0.854 | 0.880 | ( ) | (86) |
| 3 LiAl | 1.016 | 2.4% | 0.986 | 0.854 | 0.859 | 76 | 84 |
| 4 LiAl | 0.996 | 1.97% | 0.966 | 0.854 | 0.842 | −21 | 83 |
| 5 LiAl | 0.978 | 1.70% | 0.939 | 0.854 | 0.818 | −157 | 82 |
| 5 LiAl, 1 Cd | 0.940 | | 0.912 | 0.854 | 0.795 | −294 | 81.5 |
| 5 LiAl, 2 Cd | 0.914 | | 0.887 | 0.854 | 0.773 | −424 | 81 |
| 1" rod, BZ, | 1.113 | | 1.086 | 0.830 | 0.969 | 529 | 77 |
| ¾" rod, FZ, no controls | 1.173 | | 1.138 | 0.901 | 0.949 | 624 | 135 |
| ¾" rod, BZ | 1.166 | | 1.138 | 0.886 | 0.959 | 670 | 107 |

In all cases
$\eta = 1.335$,
$\tau_f = 48$ cm$^2$,
$\tau_\epsilon = 79$ cm$^2$
For 1" rods $\epsilon = 1.037$,
for ¾" rods $\epsilon = 1.028$
wherein
k = multiplication factor
p = resonance escape probability
f = thermal utilization factor
$B^2$ = total buckling
$L^2$ = neutron diffusion area
$\eta$ = average number of fast neutrons emitted as a result of the capture of one thermal neutron in fuel material
$\tau_f$ = neutron age, for slowing between fission energy and 100 kilowatts
$\tau_\epsilon$ = neutron age, for slowing between 100 kilowatts and thermal energy
$\epsilon$ = fast fission factor Cold-unpoisoned refers to a condition of a neutronic reactor at room temperature and having no fission by-products (poisons) therein to absorb neutrons during reactor operation, while hot-poisoned refers to a condition where the reactor is above room temperature and contains fission products which absorb useful neutrons.

Insertion of the first control rod decreases the reactivity considerably more than does insertion of the subsequent rods. This "shadowing" effect is due to the lowering of the neutron flux in the vicinity of the first control rod which decreases the disadvantage factor for subsequent control rods.

Interpolation for the effects of partial rod insertion must take into account the axial neutron flux distribution according to the statistical weight equation. In one-group theory this equation has the form $$\frac{\Delta k_z}{\Delta k_H} = \frac{\int_0^z \phi^2 \, dz}{\int_0^H \phi^2 \, dz} \tag{29}$$

for an absorber inserted a distance z into a pile of height H.

When one or more full rods are already in the cell, partial insertion of a control rod has little effect on the axial flux distribution. In this case equation (29) for a chopped cosine flux distribution becomes $$\frac{\Delta k_z}{\Delta k_H} = \frac{z}{14.7} - 0.114 \sin(0.4182z) - 0.01 \tag{30}$$

In equation (30), z is the distance that the rod has been inserted, measured in feet from the top of the reflector. In accordance with two-group calculations, motion of the rod in the reflector has been considered to have a negligible effect on the reactivity.

Analogously, in the rooftopped reactor where an approximation to the rooftopped flux distribution is given by the equations, $\phi = \phi_o \sin(0.35z)$   $0 \leq z \leq 5$
$\phi = \phi_o (1.29 - 0.0615z)$   $5 \leq z \leq 11$
$\phi = \phi_o 0.641 \sin[0.316(15 - z)]$   $11 \leq z \leq 15$ the partial rod worths are given by $$\frac{\Delta k_z}{\Delta k_H} = 0.0658z - 0.0007 - 0.094 \sin(0.7z)$$

$$0.5 \leq z \leq 5$$

$$\frac{\Delta k_z}{\Delta k_H} = 0.039 - 0.713(1.292 - 0.0615z)^3$$

$$5 \leq z \leq 11$$

$$\frac{\Delta k_z}{\Delta k_H} = 1.00 - 0.0423(15 - z) + 0.0667 \sin 0.632(15 - z)$$

$$11 \leq z \leq 14.5$$

The effect of half rods on the reactivity can be calculated from the above equations. With a half rod positioned so that the top of its absorbing region is five feet from the top of the reflector this treatment gives $\frac{\Delta k}{k}$ half rod $= 0.675 \frac{\Delta k}{k}$ full rod (cosine flux)

$\frac{\Delta k}{k}$ half rod $= 0.58 \frac{\Delta k}{k}$ full rod (rooftopped)

The expressions developed above for the worth of the control rods are used to calculate an average control rod configuration for normal operating conditions. The configuration is given in the table below. The critical bucklings were obtained from the data contained in the section on Flux Distribution Over the Reactor at Criticality.

| Zone | Critical Buckling | $k_\infty$ | No. of Half Rods | No. of Full Rods in each Septifoil |
|---|---|---|---|---|
| Flat | $47.2 \times 10^{-6}$ | 1.01 | 2 | 10.5 feet of 1 rod |
| Intermediate | $319.6 \times 10^{-6}$ | 1.071 | 0 | 7.5 feet of 1 rod |

The methods discussed above can be used to calculate the change in k in a single cell in the lattice when varying numbers of control rods are inserted into the cell. To find the corresponding $\Delta k$ for the whole reactor, statistical weights are used.

$$\left(\frac{\Delta k}{k}\right)_{pile} = \Sigma_{cells}\left(\frac{\Delta k}{k}\right)_{cell} W_{cell}$$

$$= \Sigma_{cells}\left(\frac{\Delta k}{k}\right)_{cell}\left(\frac{\int_{cell} \phi^2\, dV}{\int_{pile} \phi^2\, dV}\right)$$

The summation is taken over all the individual cells in which a control movement has taken place. With the standard radial flux distribution discussed in the section on Flux Distribution Over the Reactor At Criticality, the appropriate statistical weights for control cells in the flat zone and intermediate zone are
$W_{FZ} = 0.0151$
$W_{IZ} = 0.0128$
These values are valid only when the flux distribution has not been too greatly disturbed by the control changes. Experimental measurements indicate that this is usually the case when control rods are moved in only one or two cells.

The effect of some typical control rod movements may be considered. With the rods in their normal operating position, insertion of one full Li-Al rod into a single cell in the flat zone will produce a change $\Delta k/k$ for the whole reactor equal to 0.0363%. Similarly, the minimum 0.1 inch movement of all the inserted rods in the flat zone (gangs I and II) will produce an average change of 0.0008% in $\Delta k/k$.

As was indicated hereinbefore, flexibility in neutron flux control is achieved by varying the amount of the grey bodies 344 in the control rods 306a, 306c, 306e, 306f and 306g. In the particular reactor embodiment discussed, the control half rods 306a and 306g contain 8 grey bodies 344 apiece and the control full rods 306c, 306e and 306f contain 16 grey bodies apiece. The effectiveness of the grey control rods, when fully inserted, may be easily computed by methods known in the nuclear art. Assuming for the moment that a single grey full-control rod 306c (containing 16 grey bodies 344) in each control element 286 is fully inserted into the active portion of the reactor, the total effect of the absorber material in said control rods upon the reproduction factor k of the reactor may be computed as follows:

| | | |
|---|---|---|
| Weight of each body 344 | | 0.424 lb. |
| Weight of bodies 344 in the control rod 306c | $16 \times 0.424$ | = 6.8 lb. |
| Weight of (3.5%) lithium in the control rod 306c | $6.8 \times .035$ | = 0.238 lb. |
| Weight of aluminum in the control rod 306c | $6.8 - 0.238$ | = 6.56 lb. |

Since there are 61 control elements 286, the total weight of lithium inserted into the reactor is $$0.238 \times 61 = 14.5 \text{ lb.}$$

The diminishing effect upon the reproduction factor k of a reactor may be conveniently evaluated by means of certain constants known as danger coefficients which are discussed in the U.S. Pat. No. 2,708,656 issued to Fermi et al. on May 17, 1955, wherein there is also found a table of danger coefficients for a number of elements, including lithium, aluminum, cadmium and boron. The reduction in k is indicated below:

| | | |
|---|---|---|
| Danger coefficient of lithium | 310 | |
| Danger sum of lithium | $310 \times 14.5$ | = 4,500 lb. |
| Weight of uranium fuel | 20,800 lb. | |
| Reduction in k due to lithium | $\dfrac{4500}{208,000}$ | = 0.216 |
| Weight of (96.5%) aluminum in a control rod 306c | $6.8 \times .965$ | = 6.56 |
| Total weight of aluminum | $61 \times 6.56$ | = 400.0 lb. |
| Danger coefficient of aluminum | 0.30 | |
| Danger sum of aluminum | $400 \times 0.30$ | = 120.0 lb. |
| Amount of uranium fuel | 20,800 lb. | |
| Reduction in k due to aluminum | $\dfrac{120}{208,000}$ | = .0006 |
| Total reduction in k | $.0216 + .0006$ | = .0222 |

As was indicated previously, other materials possessing neutron absorption qualities may be used in place of lithium and other dimensions of rods as well as the number of rods in the groups may be varied to achieve desired flexibility in neutron absorption control. For example, cadmium may be used to replace the lithium in the presently described control rods. The cadmium may be alloyed with magnesium, if desired, and then encased in aluminum. Another neutron absorber material which can be utilized in the control rods is boron. This material is more effective than the two previously considered, namely lithium and cadmium. The boron and the aluminum may be combined by methods well known in the powder metallurgy art.

As indicated before, the worth of a single control rod may be computed by first considering the effect of it on its individual cell. Also, it was indicated that the insertion of the first rod in each septifoil decreases the reactivity considerably more than does the insertion of additional rods in said septifoil. Percentage-wise, the insertion of the last grey (fifth) rod into the septifoil exerts only a small effect upon neutronic reactivity. To exert a gradual neutron absorption effect upon the reactor, the multi-rod control element must have its individual control rods possess only a limited effect on neutron absorption, so that even the last inserted control rod will exert an influence over the reactivity. Therefore, careful consideration must be given to the concentration of neutron-absorbing material and the physical dimensions of the control rod. However, each control element has to possess sufficient number of control rods so that the effective multiplication constant can be brought below unity in the cell associated with the control element.

The foregoing disclosure is intended merely to illustrate one embodiment of the invention, and not to set forth the scope of the invention. It is therefore intended that the scope of the invention be limited only by the appended claims.

What is claimed is:

1. A neutronic reactor comprising a core consisting of a plurality of elongated, parallel fuel elements, perpendicular to a midplane of the reactor, containing thermal-neutron-fissionable material and provided with an inlet at one end and an outlet at the other end for coolant, and a plurality of elongated control elements, parallel to each other and to the fuel elements, each consisting of a housing, and a group of control rods which are separately translatable within their housing, each of said groups containing at least one control rod which is substantially shorter than the fuel elements and is located so that its midpoint is downstream, with respect to the flow of coolant through the fuel elements, from the said midplane of the reactor, the remainder of the control rods within a group being of substantially the same length as the fuel elements, said fuel elements and control elements being symmetrically disposed within a body of moderator material.

2. A neutronic reactor according to claim 1 wherein the control elements are arranged in concentric rings about a central control element.

3. A neutronic reactor according to claim 2 wherein at least half the control rods within each control element are constructed of an aluminum-lithium alloy in such a way that they will not absorb all incident neutrons and at least one of the control rods is constructed of cadmium in such a way that it will absorb all incident neutrons.

4. A neutronic reactor according to claim 3 wherein each control element contains a control rod at its center and a plurality of control rods annularly disposed thereabout and the central rod and one of the outer rods are the said substantially shorter control rods.

5. A neutronic reactor according to claim 4 wherein each control element contains two cadmium control rods of the same length as the fuel elements, three lithium-aluminum control rods of the same length as the fuel elements, and two short lithium-aluminum control rods.

6. A neutronic reactor according to claim 5 wherein the fuel elements are vertically disposed and the flow of water past the fuel elements is from top to bottom and the substantially shorter control rods are located with their midplanes located below the midplanes of the fuel elements.

7. A neutronic reactor comprising a core consisting of a plurality of elongated, parallel fuel elements containing thermal-neutron-fissionable material, and a plurality of elongated control elements, parallel to each other and to the fuel elements, each consisting of a housing and a group of control rods separately translatable within their housing, said control elements being symmetrically arranged in concentric rings about a central control element within a body of a moderator material, all control elements within each concentric ring being connected in gangs, means for operating all control rods occupying the same position in each control element within a ring simultaneously and for sequentially withdrawing the said gangs of control rods from the reactor.

* * * * *